United States Patent
Kawadu

(10) Patent No.: US 12,065,262 B2
(45) Date of Patent: Aug. 20, 2024

(54) ABNORMALITY WARNING SYSTEM AND WARNING LEVEL SETTING METHOD

(71) Applicant: DENSO CORPORATION, Kariya (JP)

(72) Inventor: Shinsuke Kawadu, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 17/979,863

(22) Filed: Nov. 3, 2022

(65) Prior Publication Data
US 2023/0049397 A1   Feb. 16, 2023

Related U.S. Application Data

(63) Continuation of application No. PCT/JP2021/022990, filed on Jun. 17, 2021.

(30) Foreign Application Priority Data

Jul. 9, 2020  (JP) ................................. 2020-118320

(51) Int. Cl.
*B64D 45/00* (2006.01)
*B64C 27/00* (2006.01)

(52) U.S. Cl.
CPC ............ *B64D 45/00* (2013.01); *B64C 27/006* (2013.01); *B64D 2045/0085* (2013.01)

(58) Field of Classification Search
CPC ............ B64D 45/00; B64D 2045/0085; B64C 27/006; B64C 29/0025; B64C 29/0033
See application file for complete search history.

(56) References Cited

U.S. PATENT DOCUMENTS

| | | | |
|---|---|---|---|
| 7,902,999 B2 * | 3/2011 | Eick | F02C 7/262 340/963 |
| 9,240,083 B2 * | 1/2016 | Isom | G07C 5/0816 |
| 10,023,318 B2 | 7/2018 | Kobayashi et al. | |
| 10,139,493 B1 * | 11/2018 | Chamberlain | G01S 17/58 |
| 11,267,562 B2 * | 3/2022 | Hahn | B64C 27/001 |
| 2012/0078463 A1 | 3/2012 | Gros et al. | |
| 2017/0066531 A1 | 3/2017 | McAdoo | |
| 2020/0164995 A1 | 5/2020 | Lovering et al. | |

FOREIGN PATENT DOCUMENTS

| | | |
|---|---|---|
| JP | H05-184002 A | 7/1993 |
| JP | 2005-49178 A | 2/2005 |
| JP | 2009-78745 A | 4/2009 |
| JP | 2009-270492 A | 11/2009 |
| JP | 2017-047736 A | 3/2017 |

\* cited by examiner

*Primary Examiner* — John A Tweel, Jr.
(74) *Attorney, Agent, or Firm* — Oliff PLC

(57) ABSTRACT

An abnormality warning system provides an abnormality warning for multiple motor systems that drive a motor used correspondingly to each of multiple rotors included in an electric aircraft. The abnormality warning system includes an abnormality determination unit and a warning level setting unit. The abnormality determination unit determines an abnormal one of the motor systems. The warning level setting unit sets a warning level to warn abnormality, based on at least position information of the rotor in the electric aircraft or the usage of the rotor corresponding to a motor system determined to be abnormal by the abnormality determination unit.

13 Claims, 14 Drawing Sheets

THIRD EMBODIMENT

THIRD EMBODIMENT

FIG. 10

FOURTH EMBODIMENT

135

| OUTPUT LEVEL OF LIFTING MOTOR \ OUTPUT LEVEL OF THRUST MOTOR | PERFORMANCE LIMIT ... NORMALITY LIMIT | SAFETY LIMIT ... PERFORMANCE LIMIT | LOWER THAN SAFETY LIMIT | THRUST FORCE LOSS |
|---|---|---|---|---|
| PERFORMANCE LIMIT ... NORMALITY LIMIT | WARNING LEVEL 2 | WARNING LEVEL 2 | WARNING LEVEL 3 | WARNING LEVEL 3 |
| SAFETY LIMIT ... PERFORMANCE LIMIT | WARNING LEVEL 3 | WARNING LEVEL 3 | WARNING LEVEL 3 | WARNING LEVEL 3 |
| LOWER THAN SAFETY LIMIT | WARNING LEVEL 3 | WARNING LEVEL 3 | WARNING LEVEL 3 | WARNING LEVEL 3 |

|  | | OUTPUT LEVEL OF THRUST MOTOR | | | |
|---|---|---|---|---|---|
|  | | PERFORMANCE LIMIT ... NORMALITY LIMIT | SAFETY LIMIT ... PERFORMANCE LIMIT | LOWER THAN SAFETY LIMIT | THRUST FORCE LOSS |
| OUTPUT LEVEL OF LIFTING MOTOR | PERFORMANCE LIMIT ... NORMALITY LIMIT | WARNING LEVEL 2 | WARNING LEVEL 2 | WARNING LEVEL 3 | WARNING LEVEL 3 |
|  | SAFETY LIMIT ... PERFORMANCE LIMIT | WARNING LEVEL 2 | WARNING LEVEL 3 | WARNING LEVEL 3 | WARNING LEVEL 3 |
|  | LOWER THAN SAFETY LIMIT | WARNING LEVEL 3 | WARNING LEVEL 3 | WARNING LEVEL 3 | WARNING LEVEL 3 |
|  | LIFT FORCE LOSS | WARNING LEVEL 4 | WARNING LEVEL 4 | WARNING LEVEL 4 | WARNING LEVEL 4 |

ABNORMALITY WARNING SYSTEM AND WARNING LEVEL SETTING METHOD

CROSS REFERENCE TO RELATED APPLICATION

The present application is a continuation application of International Patent Application No. PCT/JP2021/022990 filed on Jun. 17, 2021, which designated the U.S. and claims the benefit of priority from Japanese Patent Application No. 2020-118320 filed on Jul. 9, 2020. The entire disclosures of all of the above applications are incorporated herein by reference.

TECHNICAL FIELD

The present disclosure relates to an abnormality warning system and a warning level setting method.

BACKGROUND

In recent years, an electric aircraft such as eVTOL (electric Vertical Take-Off and Landing aircraft) uses a motor system including a motor to rotationally drive rotors.

SUMMARY

According to an aspect of the present disclosure, an abnormality warning system is to provide abnormality warning of a plurality of motor systems.

BRIEF DESCRIPTION OF THE DRAWINGS

The above and other objects, features, and advantages of the present disclosure will become more apparent from the following detailed description made by reference to the accompanying drawings. In the drawings:

FIG. 10 is an explanatory diagram illustrating settings of a warning level map according to the fourth embodiment;

FIG. 15 is an explanatory diagram illustrating settings of the warning level map according to other embodiments.

DETAILED DESCRIPTION

Figure 1:
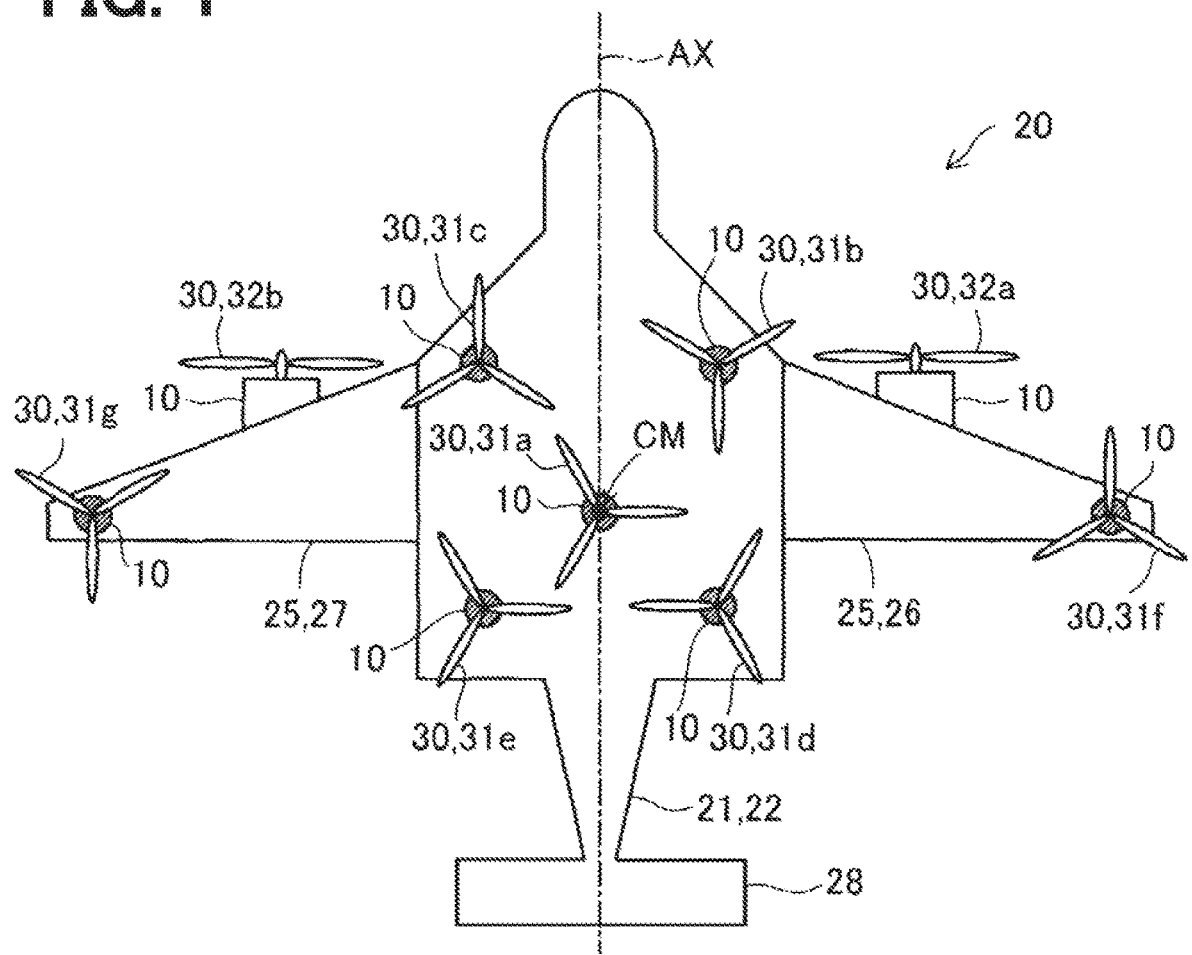
FIG. 1 is a top view schematically illustrating a configuration of an electric aircraft using the abnormality warning system as an embodiment of the present disclosure.

Hereinafter, examples of the present disclosure will be described.

According to an example of the present disclosure, an electric aircraft such as eVTOL (electric Vertical Take-Off and Landing aircraft) uses a motor system including a motor to rotationally drive rotors. The motor system includes, for example, a motor, an inverter circuit to supply the motor with power, and a control device to control the inverter circuit.

According to an example of the present disclosure, a motor system is subject to an abnormality diagnosis such as a failure diagnosis of the motor. One assumable configuration diagnoses the presence or absence of abnormality based on the presence or absence of a predetermined feature (presence or absence of a specific-frequency signal) in a phase current supplied to the motor or based on the presence or absence of the predetermined feature amount in a torque current value (q-axis current value) found from the measured values of phase current values and motor rotation speeds. When an abnormality is found as a result of the abnormality diagnosis, the occurrence of the abnormality is detected and the type of the abnormality is specified.

The detection of an abnormality may involve an "abnormality warning" about an abnormal state. While an electric aircraft is in flight, for example, the abnormality diagnosis may be performed to detect an abnormality. In such a case, the abnormality warning is required for the occupant and ground controllers. Abnormalities of the motor system in the electric aircraft may include not only an abnormality greatly affecting flight safety and requiring an emergency response but also an abnormality enabling a flight according to the current flight plan and requiring a countermeasure even after landing.

An assumable configuration may not include a function of warning and therefore may provide no warning level or provide an inappropriate warning level. With this assumable configuration, the flight may be continued despite the occurrence of an abnormality requiring an emergency response, greatly impairing the safety. Alternatively, even when an abnormality occurs that enables a flight according to the current flight plan and a countermeasure may be made after landing, the flight plan may be changed to urgently land. Consequently, this configuration would greatly impair the occupant's convenience. Therefore, a configuration that enables to set appropriate warning levels may be desirable.

According to an example of the present disclosure, an abnormality warning system is to provide abnormality warning of a plurality of motor systems. The motor systems are configured to respectively drive a plurality of motors corresponding to a plurality of rotors in an electric aircraft. The abnormality warning system comprises an abnormality determination unit configured to determine a motor system, which is abnormal, among the motor systems. The abnormality warning system further comprises a warning level setting unit configured to set a warning level to warn abnormality based on at least one of position information of a rotor, which corresponds to the motor system determined abnormal by the abnormality determination unit, among the rotors in the electric aircraft and a function of the rotor.

An abnormality of the motor system corresponding to the rotor variously affects the flight of the electric aircraft depending on the installation position of the rotor. In addition, an abnormality of the motor system corresponding to the rotor variously affects the flight of the electric aircraft depending on the usage of the rotor. The abnormality warning system according to the above-described aspect provides warning levels to warn of abnormalities based on at least the position information about the rotor in the electric aircraft or the function of the rotor corresponding to the motor system determined to be abnormal. Therefore, appropriate warning levels can be provided.

The present disclosure can also be embodied in various forms. Examples include an electric drive system or an electric aircraft including multiple motor systems, warning level setup methods, computer programs to implement these devices and methods, and non-transitory recording media to record computer programs.

A. First Embodiment

A1. Hardware Configuration

As illustrated in FIG. 1, an electric aircraft 20, also called eVTOL (electric Vertical Take-Off and Landing aircraft), is a manned aircraft that can vertically take off and land and can be horizontally thrust. The electric aircraft 20 includes an airframe 21, nine rotors 30, and nine motor systems 10 positioned correspondingly to the rotors.

The airframe 21 corresponds to the electric aircraft 20 excluding the nine rotors 30 and the nine motor systems 10. The airframe 21 includes a main body 22, a main wing 25, and a tail unit 28.

The main body 22 configures a body portion of the electric aircraft 20. The main body 22 is symmetrical about an axis AX as the axis of symmetry. In the present embodiment, the axis AX passes through a barycentric position CM of the electric aircraft 20 and extends in the longitudinal direction of the electric aircraft 20. The "barycentric position CM" applies to the electric aircraft 20 under the condition of empty weight when no occupant is on board. A passenger compartment (unshown) is formed inside the main body 22.

The main wing 25 is composed of a right wing 26 and a left wing 27. The right wing 26 is formed to extend to the right from the main body 22. The left wing 27 is formed to extend to the left from the main body 22. Each of the right wing 26 and the left wing 27 includes two rotors 30 and two motor systems 10. The tail unit 28 is formed at the rear end of the main body 22.

Five of the nine rotors 30 are placed at the center of the top face of the main body 22. These five rotors 30 function as lifting rotors 31a through 31e to primarily generate the lift for the airframe 21. The lifting rotor 31a is placed at the position corresponding to the barycentric position CM. The lifting rotors 31b and 31c are placed in front of the lifting rotor 31a at positions to be axisymmetric about the axis AX. The lifting rotors 31d and 31e are placed behind the lifting rotor 31a at positions to be axisymmetric about the axis AX. Two of the nine rotors 30 are placed on the right wing 26 and the left wing 27. Specifically, the lifting rotor 31f is placed on the upper face of the tip of the right wing 26. The lifting rotor 31g is placed on the upper face of the tip of the left wing 27.

The other two of the nine rotors 30 are placed on the right wing 26 and the left wing 27, respectively, and function as thrust rotors 32a and 32b to primarily generate the horizontal thrust force of the airframe 21. The thrust rotor 32a placed on the right wing 26 and the thrust rotor 32b placed on the left wing 27 are positioned to be axisymmetric about the axis AX. Each rotor 30 is rotationally driven independently of each other around the corresponding rotation axis (shaft 17 described later). Each rotor 30 includes three blades that are placed at an equal angle and at an equal interval.

Figure 2:
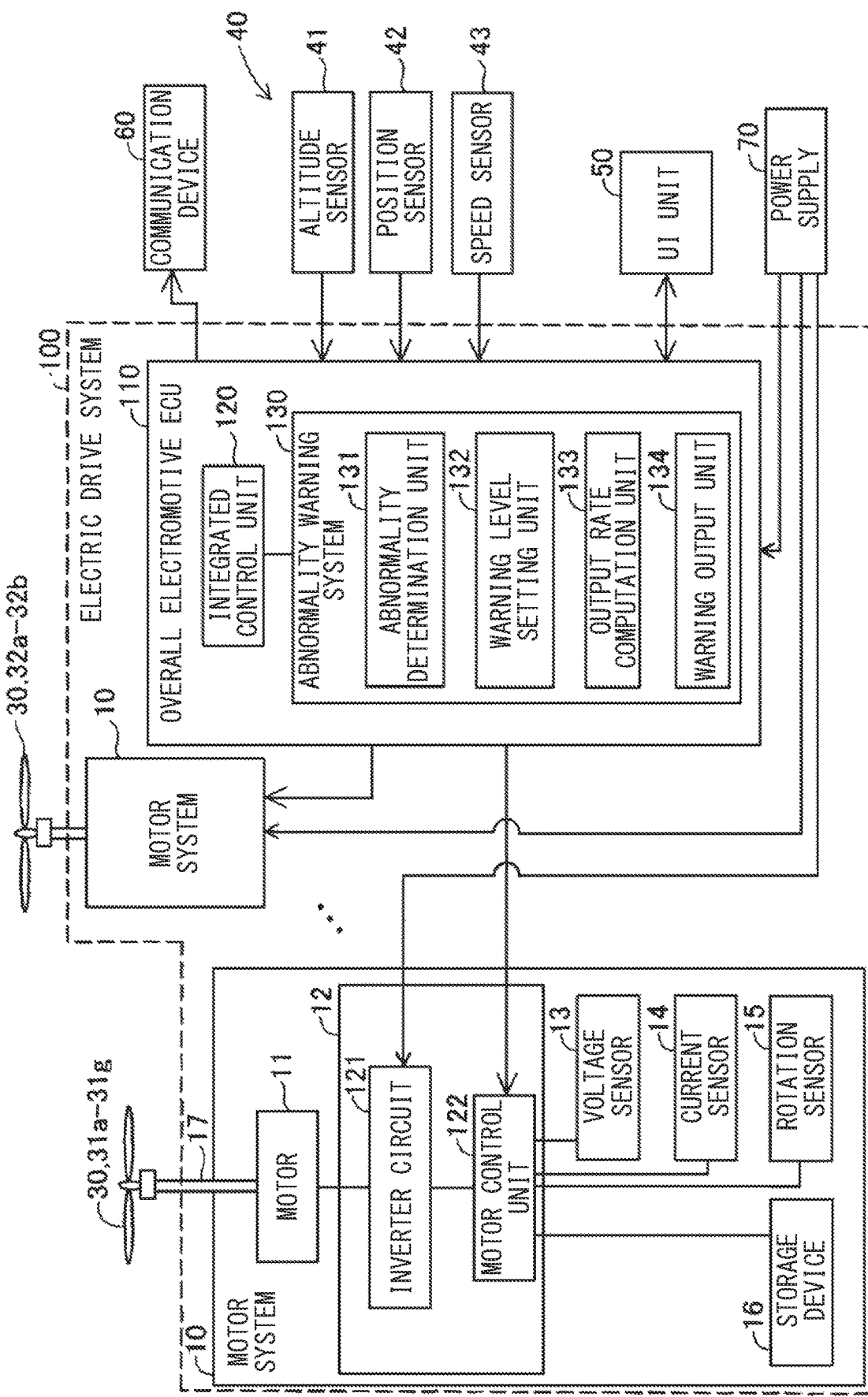
FIG. 2 is a block diagram illustrating a functional configuration of the electric drive system including the motor system according to a first embodiment.

As illustrated in FIG. 2, the nine motor systems 10 in total, corresponding to the rotors 30, are configured as part of the electric drive system 100. The electric drive system 100 controls each motor system 10 and rotationally drives the rotor 30 based on a predetermined flight program or flying by the occupant or from the outside. In the description below, a "lifting motor" represents the motor 11 that is provided for the motor system 10 and rotationally drives the lifting rotors 31a through 31g. A "thrust motor" represents the motor 11 that is provided for the motor system 10 and rotationally drives the thrust rotors 32a and 32b.

The nine motor systems 10 are almost configured similarly. Each motor system 10 includes a motor 11, an inverter unit (INV unit) 12, a voltage sensor 13, a current sensor 14, a rotation sensor 15, a storage device 16, and a shaft 17. The motor system 10 rotates the rotor 30 to satisfy the rotation torque and the rotation speed based on instructions from an overall electromotive ECU 110 (to be described).

The motor 11 rotationally drives the rotor 30 via the shaft 17. According to the present embodiment, the motor 11 is configured as a three-phase AC brushless motor and rotates the shaft 17 according to the voltage and current supplied from an inverter circuit 121 (to be described). Instead of a brushless motor, the motor 11 may be configured as any kind of motor such as an induction motor or a reluctance motor.

The inverter unit 12 includes an inverter circuit 121 and a motor control unit 122. The inverter circuit 121 includes power elements such as IGBTs (Insulated Gate Bipolar Transistors) and MOSFETs (Metal-Oxide-Semiconductor Field-Effect Transistors) and supplies driving power to the motor 11 based on switching at a duty ratio according to control signals supplied from the motor control unit 122.

The motor control unit 122 controls the motor system 10 as a whole. Specifically, the motor control unit 122 generates a drive signal in response to an instruction from an integrated control unit 120 (to be described) and supplies the drive signal to the inverter circuit 121. The motor control unit 122 performs a feedback control of the inverter circuit 121 by using values detected from the sensors 13 through 15. According to the present embodiment, the motor control unit 122 is configured as a microcomputer including a CPU, ROM, and RAM.

The voltage sensor 13 detects a voltage supplied from a power supply 70 (to be described). The current sensor 14 is provided between the inverter circuit 121 and the motor 11 and detects a drive current (phase current) of each phase of the motor 11. The rotation sensor 15 detects the rotation speed of the motor 11. Values detected from the voltage sensor 13, the current sensor 14, and the rotation sensor 15 are chronologically stored in the storage device 16 and are output to the overall electromotive ECU 110 via the motor control unit 122. The storage device 16 stores various control programs and detection values from various sensors as well as results of an abnormality diagnosis processing (to be described).

The electric drive system 100 includes the overall electromotive ECU 110 in addition to the nine motor systems 10 described above. The overall electromotive ECU 110 controls the electric drive system 100 as a whole and performs an abnormality diagnosis of the motor system 10. According to the present embodiment, the overall electromotive ECU 110 is configured as a computer including a CPU, ROM, and RAM. The CPU included in the overall electromotive ECU 110 loads a control program, previously stored in the ROM, into the RAM and executes the program to function as the integrated control unit 120 and an abnormality warning system 130.

The integrated control unit 120 controls each motor system 10 according to a predetermined flight program or steering of a control stick by the user, for example.

The abnormality warning system 130 performs an abnormality diagnosis of each motor system 10. The abnormality warning system 130 includes an abnormality determination unit 131, a warning level setting unit 132, an output rate computation unit 133, and a warning output unit 134.

The abnormality determination unit 131 performs an abnormality diagnosis process to identify an "abnormal system" that represents the motor system in an abnormal state. The description below explains the abnormality diagnosis process according to the present embodiment. First, the abnormality determination unit 131 acquires a "state-related value" from a "diagnosis target system" and a "comparison target system." The diagnosis target system represents the motor system to be diagnosed. The comparison target system represents the motor system to be compared. The state-related value relates to each motor operation state. The diagnosis target system is determined to be abnormal if a difference between the state-related value of the diagnosis target system and the state-related value of the comparison target system is greater than a predetermined threshold. The diagnosis target system is determined to be not abnormal (normal) if the difference is lower than or equal to the predetermined threshold. The state-related values include, for example, a phase current value measured by the current sensor 14, a voltage, supplied from the power supply 70, measured by the voltage sensor 13, and a rotation speed of the motor 11 measured by the rotation sensor 15. Each of the nine motor systems 10 may be identified as a diagnostic target system according to a predetermined order, for example. As a comparison target system, the specified motor system may be previously assigned to the motor system identified as a diagnosis target system, for example. The more highly reliable motor system may be defined as a comparison target system.

The warning level setting unit 132 sets warning levels to warn of abnormalities in the motor system. The warning level indicates the urgency of the warning. The higher the level, the more urgent the warning. The present embodiment can provide the following three warning levels 1 to 3. Warning level 1 is the least urgent and is set to warn of an abnormality that enables the flight to continue as is. Warning level 2 is less urgent and is set to warn of an abnormality that requires shortening the flight plan if the electric aircraft 20 is in flight. Warning level 3 is most urgent and is set to warn of an abnormality that requires an emergency landing. Implementation of a warning level setting process (to be described) sets one of the warning levels.

Warning level 1: Continued flight enabled
Warning level 2: Flight plan shortened
Warning level 3: Emergency landing The output rate computation unit 133 specifies the ratio ("output ratio") of total motor output for multiple motor systems to a "required motor output" that is required for the electric aircraft 20 to fly. Equation (1) below holds true.

$$\text{Output ratio} = \text{Total motor output} / \text{Required motor output} \quad (1)$$

The warning output unit 134 warns of an abnormality in the motor system. Specifically, the present embodiment warns of an abnormality in the motor system by displaying warning messages on a display unit included in a user interface unit (UI unit) 50 (to be described).

The electric aircraft 20 includes various components for flight and abnormality diagnosis as well as the electric drive system 100 described above. Specifically, the electric aircraft 20 includes a sensor group 40, a user interface unit 50 (UI unit 50), a communication device 60, and the power supply 70.

The sensor group 40 includes an altitude sensor 41, a position sensor 42, and a speed sensor 43. The altitude sensor 41 detects the present altitude of the electric aircraft 20. The position sensor 42 identifies the present position of the electric aircraft 20 in terms of latitude and longitude. According to the present embodiment, the position sensor 42 is configured as GNSS (Global Navigation Satellite System). The GNSS may use GPS (Global Positioning System), for example. The speed sensor 43 detects the speed of the electric aircraft 20.

The UI unit 50 provides the occupant of the electric aircraft 20 with a user interface to control the electric aircraft 20 and monitor operation states. The user interface includes an operation input unit such as a keyboard or a button and a display unit such as a liquid crystal panel, for example. The UI unit 50 is provided for a cockpit of the electric aircraft 20, for example. The occupant can use the UI unit 50 to change the flight plan or confirm the warning.

The communication device 60 communicates with other electric aircraft and ground control towers. The communication device 60 is available as a commercial VHF radio, for example. The communication device 60 may be configured to provide communications including not only commercial VHF but also wireless LAN compliant with IEEE 802.11 and wired LAN compliant with IEEE802.3. The power supply 70 is configured as a lithium-ion battery and functions as one of the power supply sources in the electric aircraft 20. The power supply 70 supplies three-phase AC power to the motor 11 via the inverter circuit 121 of each motor system 10. The power supply 70 may be configured as any secondary battery such as a nickel-hydrogen battery instead of the lithium-ion battery. The power supply 70 may be configured as any power supply source such as a fuel cell or a power generator instead of or in addition to the secondary battery.

A2. Warning Level Setting Process

Figure 3:
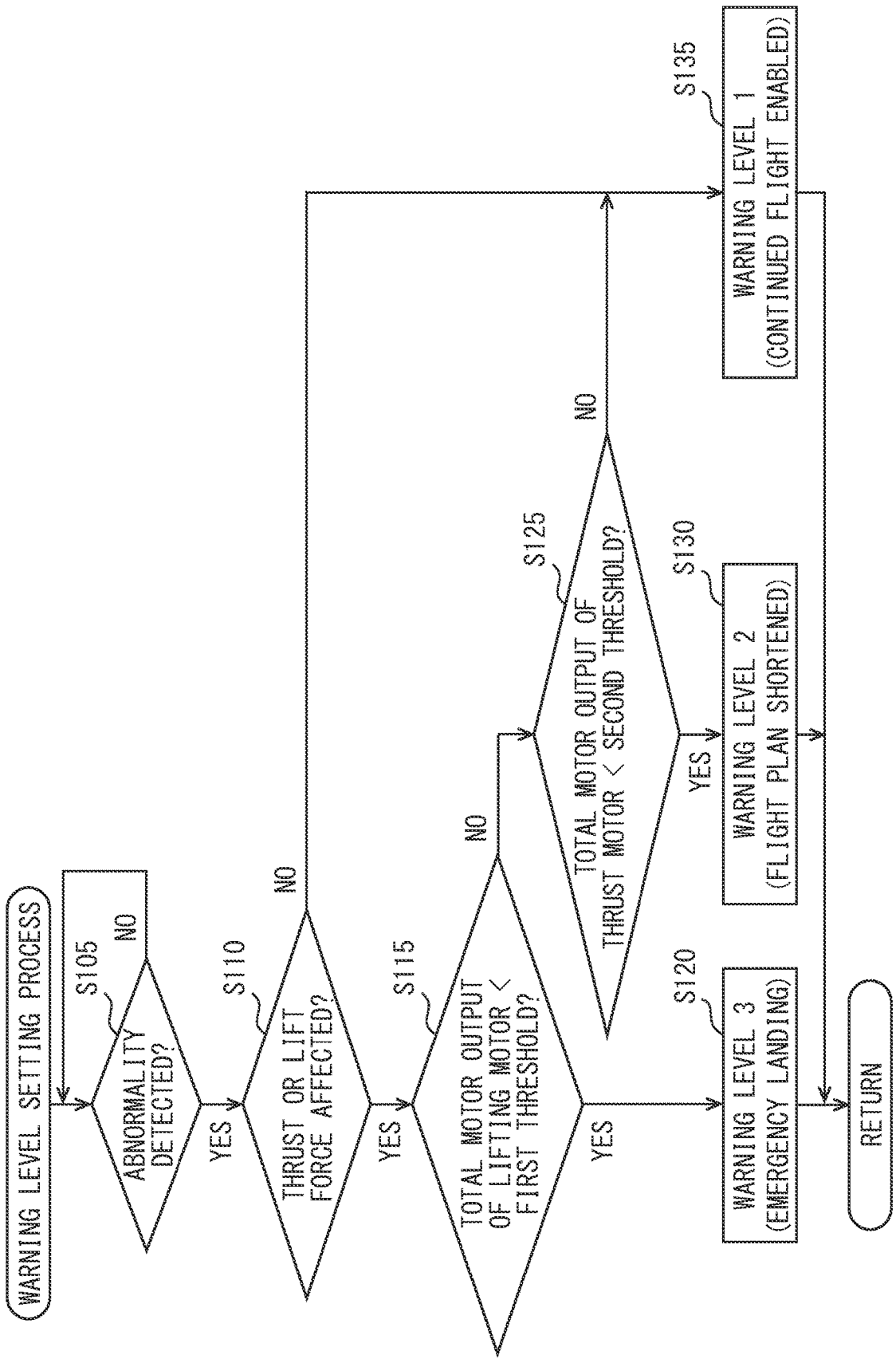
FIG. 3 is a flow chart illustrating a warning level setting process according to the first embodiment.

As illustrated in FIG. 3, the warning level setting process sets a warning level and is performed when the power supply for the overall electromotive ECU 110 turns on. The abnormality determination unit 131 performs an abnormality diagnosis for each motor system 10 to determine whether an abnormality is detected (step S105). It is determined that no abnormality is detected (step S105: NO). Then, the process returns to step S105.

After the abnormality diagnosis is performed for each motor system 10, it is determined that at least one motor system 10 is abnormal and, consequently, an abnormal system is detected (step S105: YES). Then, the warning level setting unit 132 determines whether the abnormality detected in the motor system 10 affects thrust or lift force of the electric aircraft 20 (step S110). The determination "whether to affect thrust or lift force" references a map previously stored in a storage unit (not shown) included in the overall electromotive ECU 110. The map previously lists "abnormal contents affecting thrust or lift force." For example, the map lists "failure of the inverter circuit 121,"

"failure of the CPU included in the overall electromotive ECU 110," "failure of a sensor without redundancy," and "failure of specific parts." The specific parts correspond to a motor coil included in the motor 11, an inverter circuit element included in the inverter circuit 121, and parts of a cooling system (not shown) such as a pump for cooling media. However, abnormalities of the type of motor system 10, not included in the map, are determined to not affect thrust or lift force of the electric aircraft 20.

It is determined that the abnormality detected in the motor system 10 does not affect the thrust or lift force of the electric aircraft 20 (step S110: NO). Then, the warning level setting unit 132 sets warning level 1 (step S135) as the warning level. In this case, the warning level is set to indicate that continued flight can be performed. The warning output unit 134 outputs the warning at warning level 1 to the UI unit 50.

At step S110, the abnormality detected in the motor system 10 is determined to affect the thrust or lift force of the electric aircraft 20 (step S110: YES). Then, the output rate computation unit 133 determines whether the total motor output of the lifting motor is lower than a first threshold (step S115). The first threshold is found by multiplying the total landing output (above described) by a threshold predetermined for the above-described output ratio. Therefore, step S110 is comparable to the determination of whether equation (2) below holds. According to equation (3) resulting from rewriting equation (2), step S115 may be comparable to a process that determines whether the output ratio (total motor output/total landing output) of the lifting motor is lower than a threshold rate. The "threshold rate predetermined for the output ratio of the lifting motor" is previously defined according to experiments or simulations. If the output ratio is lower than the threshold rate, driving of only the lifting rotors cannot maintain altitude and significantly degrades the flight stability.

$$\text{Total motor output} < (\text{Threshold rate} \times \text{Total landing output}) \quad (2)$$

$$(\text{Total motor output}/\text{Required motor output}) < \text{Threshold rate} \quad (3)$$

It is determined that the total motor output of the lifting motor is lower than the first threshold (step S115: YES). Then, the warning level setting unit 132 sets warning level 3 (step S120). In this case, the warning level is set to require an emergency landing. The warning output unit 134 outputs the warning at warning level 3 to the UI unit 50.

At step S115 described above, it is determined that the total motor output of the lifting motor is not lower than the first threshold (step S115: NO). Then, the output rate computation unit 133 determines whether the total motor output of the thrust motor is lower than a second threshold (step S125). Similar to S115, step S125 may be comparable to a process that determines whether the output ratio (total motor output/required motor output) of the motor to rotationally drive the thrust rotors is lower than a threshold ratio. The "threshold rate predetermined for the output ratio of the thrust motor" is previously defined according to experiments or simulations. If the output ratio is lower than the threshold rate, driving of the thrust rotors cannot maintain altitude and significantly degrades the flight stability.

It is determined that the total motor output of the thrust motor is lower than the second threshold (step S125: YES). Then, the warning level setting unit 132 sets warning level 2 (step S130). In this case, the warning level is set to require shortening the flight plan. The warning output unit 134 outputs the warning at warning level 2 to the UI unit 50. At step S125 above, it is determined that the total motor output of the thrust motor is not lower than the second threshold (step S125: NO). Then, step S135 above is performed to set warning level 1. The process returns to step S105 on completion of steps S120, S130, and S135 above.

"Warning level 2" is lower than "warning level 3" which is set when the total motor output of the lifting motor is lower than the first threshold. "Warning level 2" is set when the total motor output of the thrust motor is lower than the second threshold at step S125. The reason follows. If the total motor output of the lifting motor is lower than the first threshold (step S115: YES), the electric aircraft 20 cannot maintain the altitude only by rotationally driving the lifting rotors. In such a case, the highest "warning level 3" is set. At step S125, the total motor output of the thrust motor is lower than the second threshold (step S125: YES). Then, the total motor output of the lifting motor is higher than or equal to the first threshold. This configuration enables to maintain the altitude through the use of the lift force generated by driving the lifting motor. Therefore, the urgency of responding to the abnormality is low and requires the lower "warning level 2." When an abnormality is detected in the motor system 10, the present embodiment sets the warning level according to the function (lift or thrust) of the rotor rotationally driven by the motor system. This configuration enables to avoid setting a low warning level despite the abnormality requiring an urgent response or setting a high warning level despite the abnormality requiring a less urgent response, necessitating needless emergency landing, and impairing the occupant's convenience.

According to the first embodiment, as above, the motor system 10 sets the warning level appropriate to the function of the rotor corresponding to the abnormal system. An appropriate warning level can be provided.

When the total motor output of the lifting motor is lower than the first threshold, the warning level is set to be higher than that set when the total motor output of the same is higher than the first threshold. The higher warning level can be set when the total motor output is low and an abnormality occurs to require a more urgent response. This configuration enables to avoid taking a slow response and compromising safety. Similarly, when the total motor output of the lifting motor is lower than the second threshold, the warning level is set to be higher than that set when the total motor output of the same is higher than the second threshold. The higher warning level can be set when the total motor output is low and an abnormality occurs to require a more urgent response. This configuration enables to avoid taking a slow response and compromising safety. The lower warning level can be set when the total motor output is high and an abnormality occurs to require a less urgent response. This configuration enables to avoid necessitating needless emergency landing and impairing the occupant's convenience.

There may be no influence on the thrust or lift force, namely, the electric aircraft 20 is free from damage to the thrust function and the lift function. In such a case, the lowest "warning level 1" is set. If neither of the two functions is impaired, the present embodiment sets the warning level lower than that set when at least one of the two functions is damaged. This configuration enables to avoid necessitating an emergency landing and shortening the flight plan to cause inconvenience to the electric aircraft occupant even though neither the thrust function nor the lift function is impaired.

B. Second Embodiment

The abnormality warning system 130 of the second embodiment differs from the abnormality warning system 130 of the first embodiment in specific steps of the warning level setting process. The electric aircraft 20 including the abnormality warning system 130 according to the second embodiment uses the same hardware configuration as the electric aircraft 20 according to the first embodiment. The same configuration is designated by the same reference symbol and a detailed description is omitted for the sake of brevity.

Figure 4:
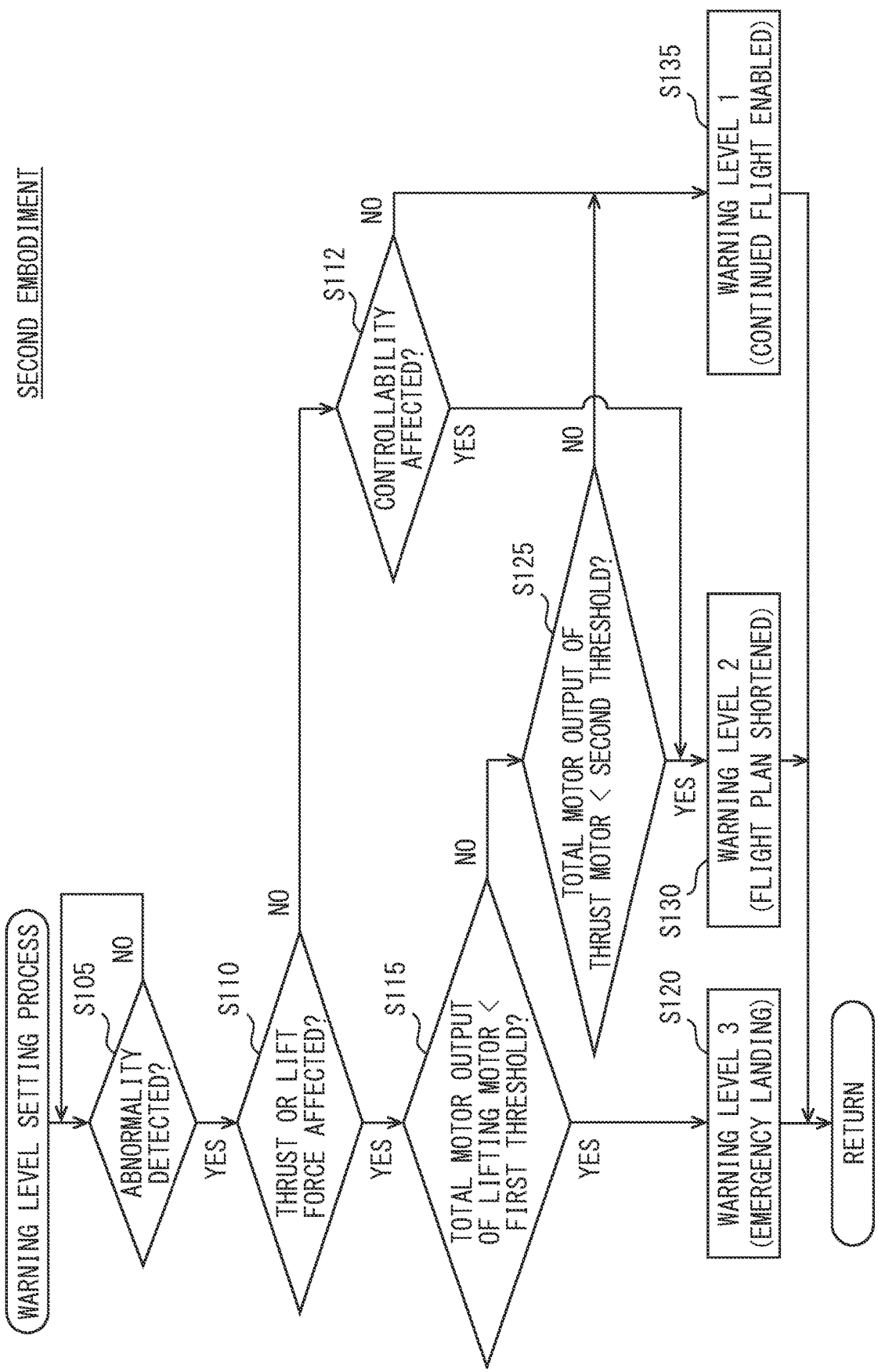
FIG. 4 is a flow chart illustrating the warning level setting process according to a second embodiment.

As illustrated in FIG. 4, the warning level setting process according to the second embodiment differs from the warning level setting process (FIG. 3) according to the first embodiment in the addition of step S112. The other steps in the warning level setting process according to the second embodiment are equal to those of the warning level setting process according to the first embodiment. The same steps are designated by the same reference symbols and a detailed description is omitted for the sake of brevity.

At step S110, it is determined that there is no effect on the thrust or lift force of the electric aircraft 20 (step S110: NO). Then, the warning level setting unit 132 determines whether the controllability of the electric aircraft 20 is affected (step S112). The controllability signifies whether the control can be provided easily or accurately. For example, suppose the measurement accuracy degrades due to abnormal characteristics of various sensors and the electric aircraft 20 is controlled based on the measurements. Then, the control accuracy may decrease, affecting the controllability. Suppose a decrease in the capacity of a smoothing capacitor (not shown) included in the inverter circuit 121 also decreases the voltage supplied to each motor system 10. Then, the controllability degrades and is affected. However, the control of the electric aircraft 20 itself is not affected despite the malfunction of functional units to detect failures such as a signal line dedicated to failure detection and a comparison circuit, for example. Similarly, malfunction of a functional part to perform the fail-safe function does not affect the control of the electric aircraft 20 itself, for example. These failures do not affect the controllability. According to the present embodiment, the storage unit of the abnormality warning system 130 previously stores a map that maintains the correspondence between the abnormality type and the determination of whether to affect the controllability. At step S112, the process references the map to determine whether the controllability of the electric aircraft 20 is affected.

It is determined that the controllability of the electric aircraft 20 is not affected (step S112: NO). Then, step S135 is performed to set "warning level 1." However, it is determined that the controllability of the electric aircraft 20 is affected (step S112: YES). Then, step S130 is performed to set "warning level 2." When the controllability of the electric aircraft 20 is affected, a response needs to be more urgent than the case where the controllability is not affected. In such a case, the present embodiment provides a higher warning level.

As above, the abnormality warning system 130 according to the second embodiment provides an effect similar to that of the abnormality warning system 130 according to the first embodiment. In addition, it is determined whether the detected abnormality affects the controllability of the electric aircraft 20. If the controllability is determined to be affected, the warning level is set to be higher than the case where the controllability is determined to not be affected. An easy response is available.

C. Third Embodiment

C1. Hardware Configuration

The abnormality warning system 130 of the third embodiment differs from the abnormality warning system 130 of the first embodiment in specific steps of the warning level setting process. The abnormality warning system 130 according to the third embodiment uses the same hardware configuration as the abnormality warning system 130 according to the first embodiment. The same configuration is designated by the same reference symbol and a detailed description is omitted for the sake of brevity. According to the third embodiment, an electric aircraft 20a mounted with the abnormality warning system 130 is configured differently from the electric aircraft 20 according to the first embodiment. The description below explains the configuration of the electric aircraft 20a by reference to FIGS. 5 and 6.

Figure 5:
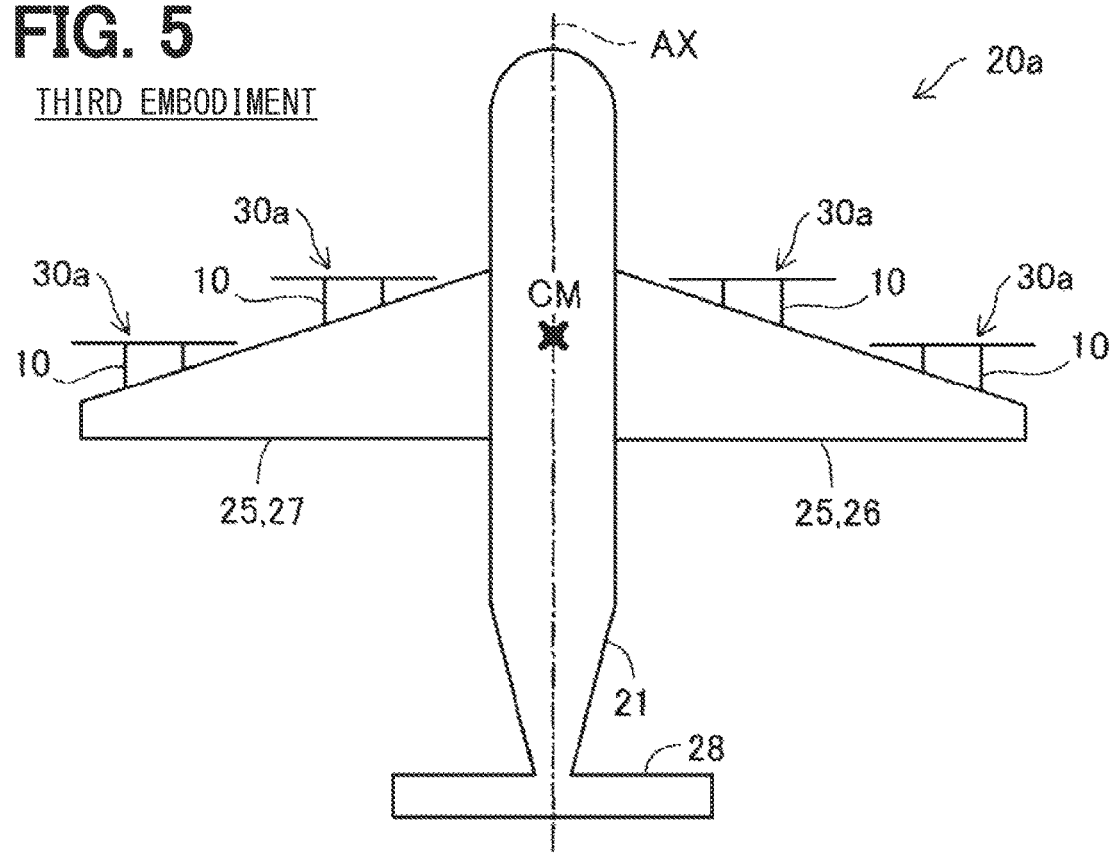
FIG. 5 is a top view schematically illustrating a configuration of the electric aircraft according to a third embodiment.
Figure 6:
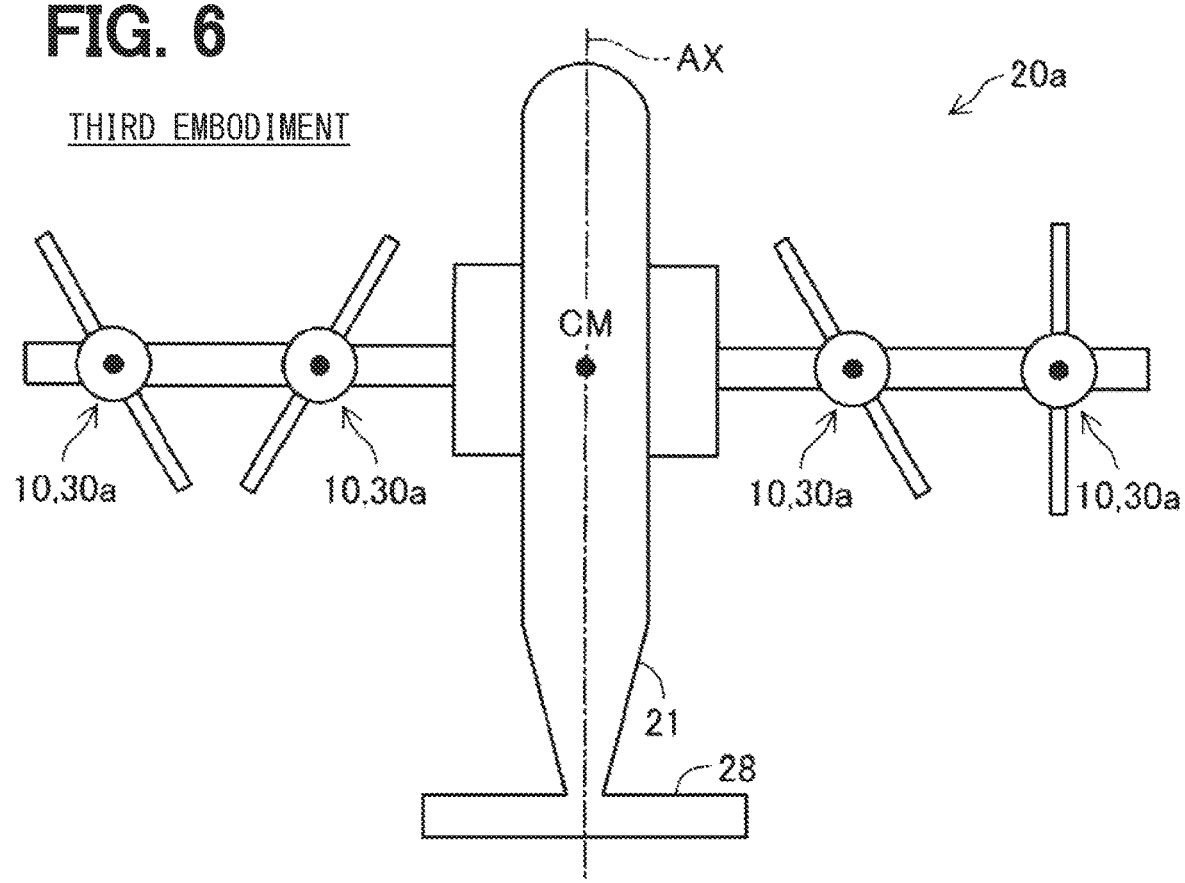
FIG. 6 is a top view schematically illustrating a configuration of the electric aircraft according to the third embodiment.

As illustrated in FIGS. 5 and 6, the electric aircraft 20a has a so-called tilt-wing airframe. FIG. 5 is a top view illustrating the electric aircraft 20a during a cruise. FIG. 6 is a top view illustrating the electric aircraft 20a during a direct lift.

Similar to the electric aircraft 20 according to the first embodiment, the electric aircraft 20a according to the third embodiment includes the airframe 21, the main wing 25, and the tail unit 28. Each of the right wing 26 and the left wing 27 includes two sets of the motor system 10 and the rotor 30a. The rotor 30a differs from the rotor 30 according to the first embodiment in that the rotor 30a functions as a lifting rotor as well as a thrust rotor. The other configurations are unchanged. According to the present embodiment, the right wing 26 and the left wing 27 are configured to be rotatable. As illustrated in FIG. 5, the right wing 26 and the left wing 27 are controlled to be approximately horizontal during a cruise. The rotor 30a can be rotationally driven in parallel with the vertical direction to generate thrust force. As illustrated in FIG. 6, the right wing 26 and the left wing 27 are controlled to be approximately vertical during a direct lift. The rotor 30a can be rotationally driven in parallel with the horizontal direction to generate a lift.

C2. Warning Level Setting Process

Figure 7:
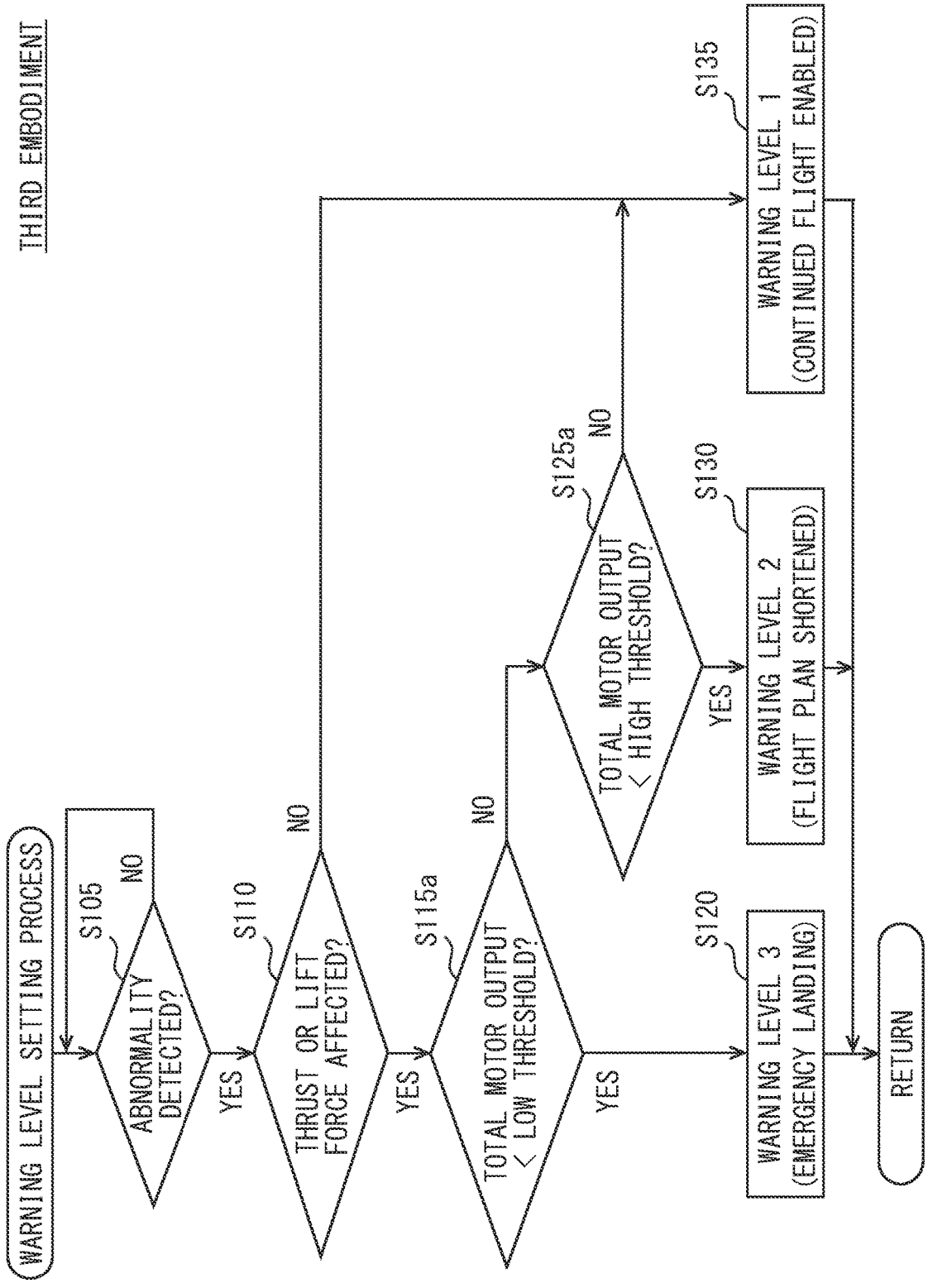
FIG. 7 is a flow chart illustrating the warning level setting process according to the third embodiment.

The warning level setting process according to the third embodiment illustrated in FIG. 7 differs from the warning level setting process according to the first embodiment illustrated in FIG. 3 in that step S115a replaces step S115 and step S125a replaces step S125. The other steps in the warning level setting process according to the third embodiment are equal to those in the warning level setting process according to the first embodiment. The same steps are designated by the same reference symbols and a detailed description is omitted for the sake of brevity.

It is determined that the abnormality detected in the motor system 10 affects the thrust or lift force of the electric aircraft 20 (step S110: YES). Then, the output rate computation unit 133 determines whether the total motor output of all motors is lower than a low threshold (step S115a). According to the first embodiment, step S115 performs the determination of the total motor output of the lifting motor. Step S115a performs the determination of the total motor output of all motors. This is because the rotor 30a functions both as a lifting rotor and as a thrust rotor. By reference to FIG. 8, the description below explains the "low threshold" above and a "high threshold" (to be described).

Figure 8:
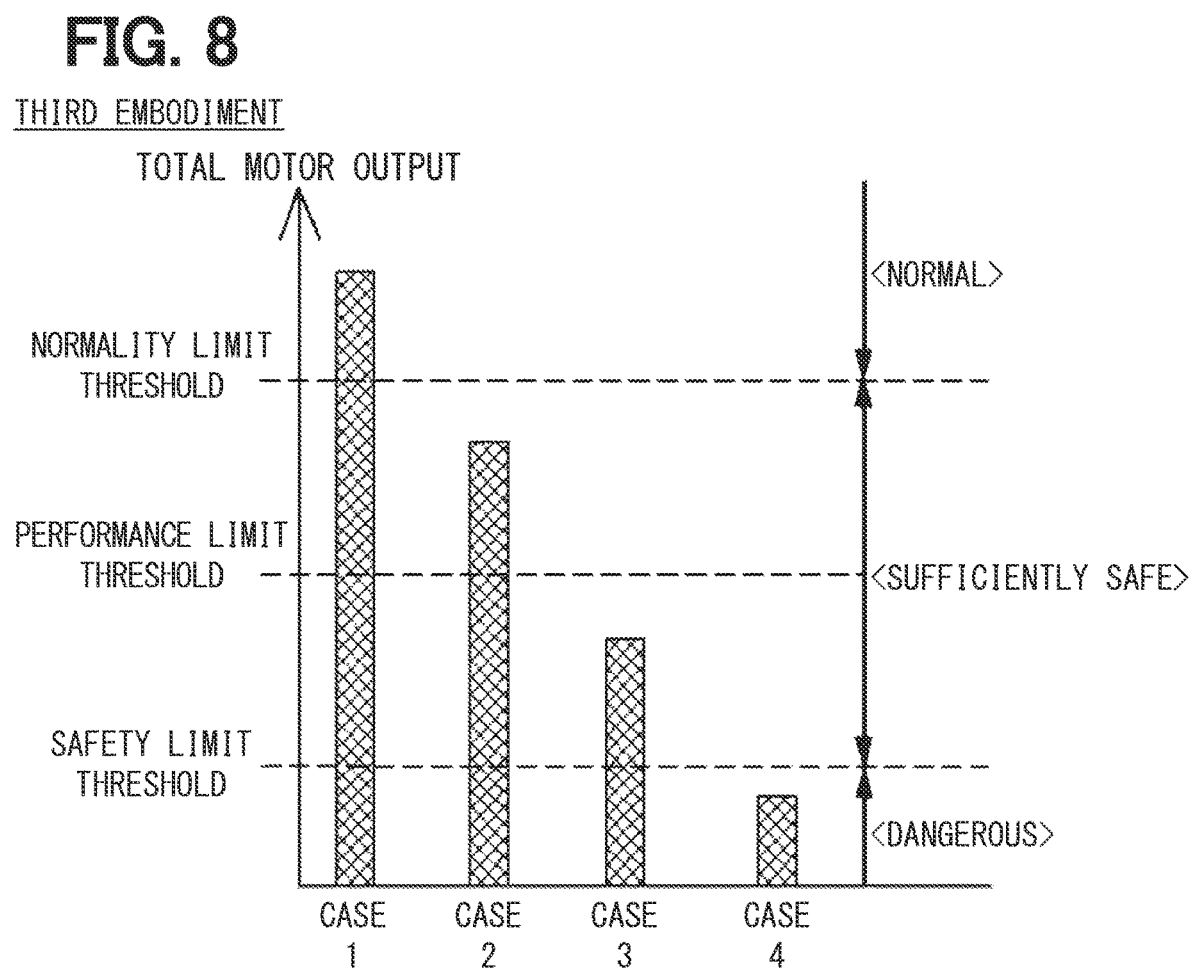
FIG. 8 is an explanatory diagram illustrating total motor output levels according to the third embodiment.

In FIG. 8, the vertical axis shows the total motor output. The horizontal axis shows four model cases corresponding to different total motor outputs. The third embodiment provides three thresholds, namely, "normality limit threshold," "performance limit threshold," and "safety limit threshold" for the total motor outputs. The "normality limit threshold" or higher enables the normal flight. The "performance limit threshold" or higher can maximize the airframe performance according to the intended design. The "safety limit threshold" or higher can ensure safety regardless of the skill of the pilot. These thresholds can be defined based on preliminary experiments or simulations. For example, in "case 1," the total motor output is higher than the normality limit threshold, enabling the electric aircraft 20a to fly normally. In "case 2," the total motor output is lower than the normality limit threshold and is higher than the performance limit threshold, making it possible to maximize the airframe performance according to the intended design. In "case 3," the total motor output is lower than the performance limit threshold and is higher than the safety limit threshold, making it possible to ensure safety regardless of the skill of the pilot. In "case 4," the total motor output is lower than the safety limit threshold. Therefore, a highly skilled pilot may ensure safety but otherwise may not ensure safety. As illustrated on the right end of FIG. 8, the flight condition of the electric aircraft 20a is dangerous when the total motor output is lower than the safety limit threshold. A sufficiently safe state is ensured when the total motor output is higher than or equal to the safety limit threshold and is lower than the normality limit threshold. A normal state is ensured when the total motor output is higher than or equal to the normality limit threshold. In the present embodiment, the "low threshold" corresponds to the "safety limit threshold." The "high threshold" corresponds to the "performance limit threshold."

As illustrated in FIG. 7, it is determined that the total motor output is lower than the low threshold (step S115a: YES). Then, step S120 is performed to set "warning level 3." It is determined that the total motor output of the motor is not lower than the low threshold (step S115a: NO). Then, the output rate computation unit 133 determines whether the total motor output of all motors is lower than the high threshold (step S125a).

It is determined that the total motor output is lower than the high threshold (step S125a: YES). Then, step S130 is performed to set "warning level 2." It is determined that the total motor output is not lower than the high threshold (step S125a: NO). Then, step S135 is performed to set "warning level 1."

As above, the abnormality warning system 130 according to the third embodiment provides an effect similar to that of the abnormality warning system 130 according to the first embodiment. An additional effect is available under the condition that the electric aircraft 20a with a tilt-wing airframe is equipped with an abnormality warning system 130a. Warning level 3 can be set when the total motor output is lower than the safety limit threshold. Warning level 2 can be set when the total motor output is higher than or equal to the safety limit threshold and is lower than the performance limit threshold. Warning level 1 can be set when the total motor output is higher than or equal to the performance limit threshold and is lower than the normality limit threshold. Therefore, an appropriate warning level can be set according to the total motor output.

D. Fourth Embodiment

D1. Hardware Configuration

Figure 9:
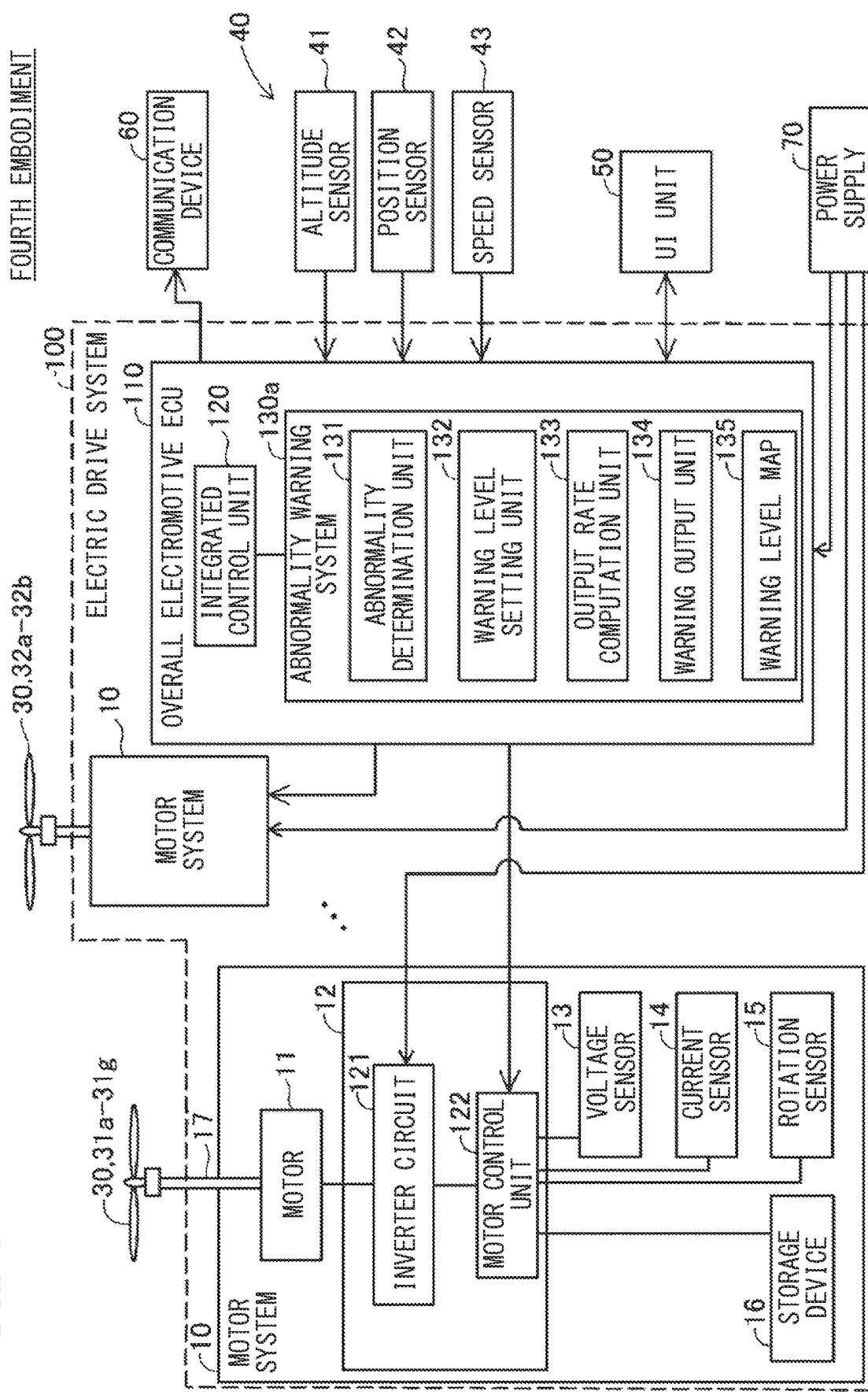
FIG. 9 is a block diagram illustrating a functional configuration of the electric drive system including the motor system according to a fourth embodiment.

The abnormality warning system 130a according to the fourth embodiment illustrated in FIG. 9 differs from the abnormality warning system 130 according to the first embodiment illustrated in FIG. 2 in that a warning level map 135 is included. The other configurations of the abnormality warning system 130a according to the fourth embodiment are equal to those of the abnormality warning system 130 according to the first embodiment. The same configuration is designated by the same reference symbol and a detailed description is omitted for the sake of brevity.

FIG. 10 illustrates the warning level map 135 according to the fourth embodiment. Each warning level is associated with a combination of the total motor output of the lifting motor and the total motor output of the thrust motor. The total motor output of the lifting motor is assigned with three output levels (i) to (iii) as follows.

(i) Lower than the safety limit threshold (ii) Higher than or equal to the safety limit threshold and lower than the performance limit threshold (iii) Higher than or equal to the performance limit threshold and lower than the normality limit The total motor output of the thrust motor is assigned with the above-described three output levels (i) to (iii) and the following output level (iv).

(iv) Thrust force loss

The safety limit threshold, the performance limit threshold, and the normality limit threshold in the output levels (i) to (iii) above are already described in the third embodiment and a detailed description is omitted for the sake of brevity. The thrust force loss as output level (iv) signifies that the total motor output of the thrust motor is 0 (zero).

As illustrated in FIG. 10, "warning level 3" is set regardless of the thrust motor output level when the lifting motor output level is "lower than the safety limit threshold" and is "higher than or equal to the safety limit threshold and lower than the performance limit threshold." "Warning level 3" is set when the lifting motor output level is "higher than or equal to the performance limit and lower than the normality limit" and the thrust motor output level is "lower than the safety limit" or corresponds to "the thrust force loss." "Warning level 2" is set when the lifting motor output level is "higher than or equal to the performance limit threshold and lower than the normality limit" and the thrust motor output level is "higher than or equal to the safety limit threshold and lower than the performance limit threshold" or "higher than or equal to the performance limit threshold and lower than the normality limit."

"Warning level 2" is set when the lifting motor output level is "higher than or equal to the performance limit threshold and lower than the normality limit" and the thrust motor output level is "higher than or equal to the safety limit threshold and lower than the performance limit threshold." Meanwhile, "warning level 3" is set when the output level is reversed, namely, when the lifting motor output level is "higher than or equal to the safety limit threshold and lower than the performance limit threshold" and the thrust motor output level is "higher than or equal to the performance limit threshold and lower than the normality limit." This is due to a difference from the rotor function described in the first embodiment. The lifting motor has the function of rotationally driving the rotor used to generate the lift of the electric aircraft 20. The decrease in output due to a failure, for example, greatly affects the flight of the electric aircraft 20, compared to the decrease in the thrust motor output. As a solution, the present embodiment previously configures a warning table to maintain the high warning level (warning level 3) when the lifting motor reaches an output level equal to that of the thrust motor.

D2. Warning Level Setting Process

Figure 11:
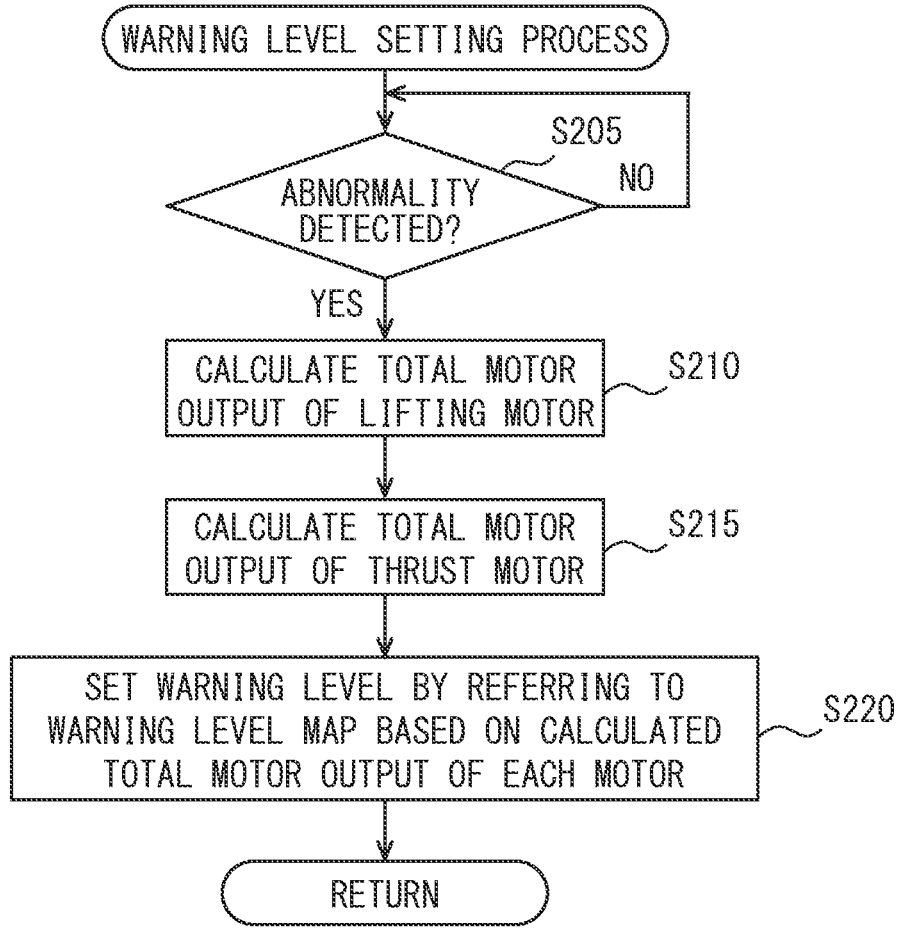
FIG. 11 is a flowchart illustrating the warning level setting process according to the fourth embodiment.

Similar to the warning level setting process according to the first embodiment, the warning level setting process according to the fourth embodiment illustrated in FIG. 11 sets the warning levels. The warning level setting process is performed when the power supply of the overall electromotive ECU 110 turns on. The abnormality determination unit 131 performs an abnormality diagnosis on each motor system 10 to determine whether an abnormality is detected (step S205). It is determined that no abnormality is detected (step S205: NO). Then, the process returns to step S105. Step S205 is equal to step S105 in the warning level setting process of the first embodiment and a detailed description is omitted for the sake of brevity.

It is determined that an abnormality is detected (step S205: YES). Then, the output rate computation unit 133 identifies the total motor output of the lifting motor (step S210). The output rate computation unit 133 also identifies the total motor output of the thrust motor (step S215).

The warning level setting unit 132 sets the warning level by referring to the warning level map 135 illustrated in FIG. 10 (step S220) based on the total motor output of the lifting motor identified in step S210 and the total motor output of the thrust motor identified in step S215. For example, suppose the lifting motor output level (total motor output) is higher than or equal to the safety limit threshold and is lower than the performance limit threshold and the thrust motor output level (total motor output) is higher than or equal to the performance limit threshold and is lower than the normality limit threshold. Then, "warning level 3" is set. After the completion of step S220, the process returns to step S205.

The above-described abnormality warning system 130a according to the fourth embodiment provides the same effect as the abnormality warning system 130 according to the first embodiment. In addition, the warning level is set by reference to the warning level map 135 containing the predetermined warning levels based on the combination of the total motor output of the lifting motor and the total motor output of the thrust motor. An appropriate warning level can be set easily and in a short time. Assuming that the output level is unchanged, a higher warning level (warning level 3) is set when the lifting motor reaches the output level rather than when the thrust motor reaches the output level. A higher warning level can be set when an abnormality occurs in the motor system 10 including the lifting motor that greatly affects the flight of the electric aircraft 20.

E. Fifth Embodiment

Figure 12:
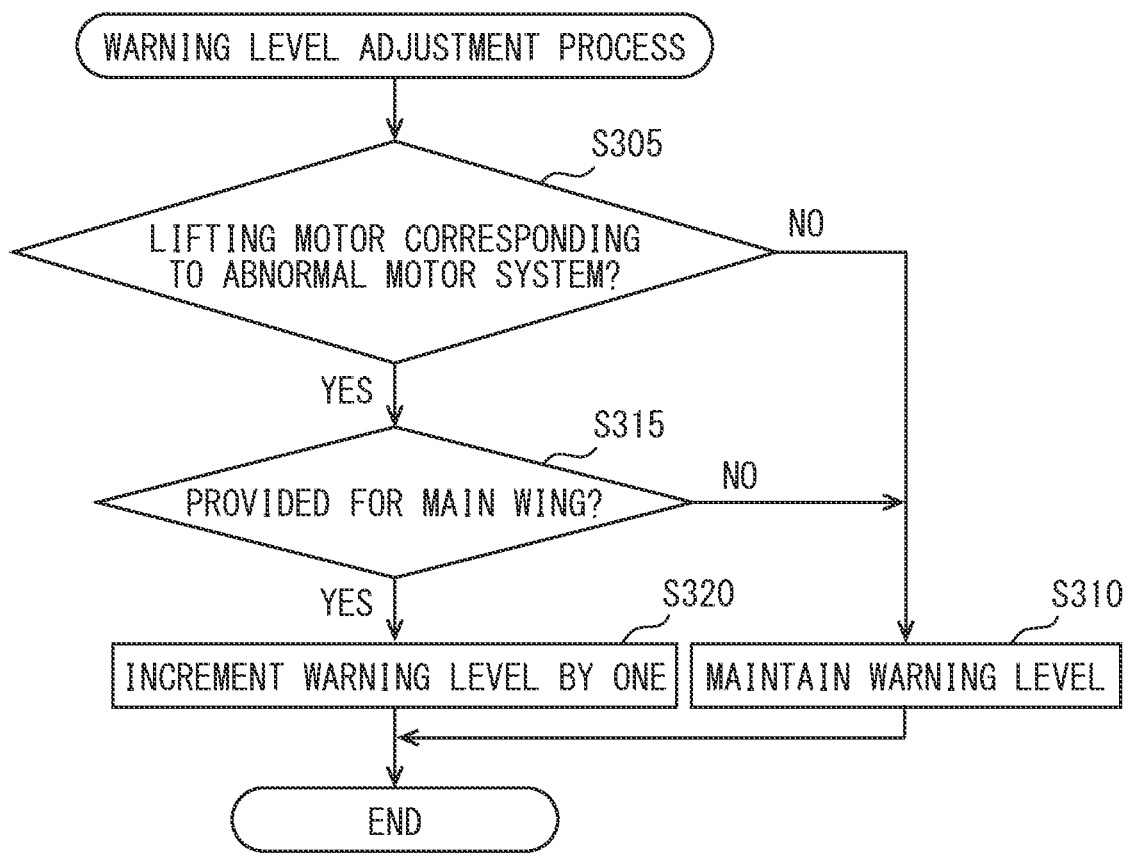
FIG. 12 is a flowchart illustrating a warning level adjustment process according to a fifth embodiment.

The configuration of the abnormality warning system 130 according to the fifth embodiment is equal to the configuration of the abnormality warning system 130 according to the first embodiment. The same configuration is designated by the same reference symbol and a detailed description is omitted for the sake of brevity. The abnormality warning system 130 according to the fifth embodiment is mounted on the same electric aircraft as the electric aircraft 20 according to the first embodiment illustrated in FIG. 1. The abnormality warning system 130 according to the fifth embodiment differs from the abnormality warning system 130 according to the first embodiment in that a warning level adjustment process illustrated in FIG. 12 is performed in addition to the warning level setting process illustrated in FIG. 3. The warning level adjustment process adjusts the warning level set by the warning level setting process. The warning level adjustment process is performed when any of steps S120, S130, and S135 in the warning level setting process is completed.

As illustrated in FIG. 12, the warning level setting unit 132 determines whether the lifting motor corresponds to the motor system (hereinafter referred to as an "abnormal system") determined to be abnormal in the warning level setting process (step S305). It is determined that the lifting motor does not correspond to the abnormal system (step S305: NO). Then, the warning level setting unit 132 maintains the warning level (step S310). In this case, the warning level remains the same as that settled by the warning level setting process.

It is determined that the lifting motor does correspond to the abnormal system (step S305: YES). Then, the warning level setting unit 132 determines whether the rotor 30, rotationally driven by the lifting motor, is provided for the main wing 25, namely, the rotor 30 corresponds to one of two lifting rotors 31f and 31g (step S315).

It is determined that the rotor 30, rotationally driven by the lifting motor, is not provided for the main wing 25, namely, it corresponds to any of the lifting rotors 31a through 31e (step S315: NO). Then, step S310 is performed to maintain the warning level. It is determined that the rotor 30, rotationally driven by the lifting motor, is provided for the main wing 25, namely, it corresponds to one of the two lifting rotors 31f and 31g (step S315: YES). Then, the warning level setting unit 132 increments the warning level by one (step S320). The warning level adjustment process terminates after the completion of step S310 or S320. The warning level may be set to "warning level 3" as the maximum level. In this case, the warning level is unchanged.

For example, the warning level setting process sets "warning level 2" under the following conditions: it is determined that a failure of the motor system 10 including the lifting motor affects thrust or lift force (step S110: YES); the total motor output of the lifting motor is greater than or equal to the first threshold (step S115: NO); and the total motor output of the thrust motor is smaller than the second threshold (step S125: YES). However, the warning level is incremented by one and is adjusted (changed) to "warning level 3" when the failed motor system 10 rotationally drives one of the two lifting rotors 31f and 31g provided for the main wing 25. Meanwhile, the warning level remains "warning level 2" when the failed motor system 10 rotationally drives any of the five lifting rotors 31a through 31e provided for the main body 22.

As above, the warning level is incremented by one when the failed motor system 10 rotationally drives one of the two lifting rotors 31f and 31g provided for the main wing 25. The reason follows. The two lifting rotors 31f and 31g provided for the main wing 25 are located far from the barycentric position CM. The attitude of the electric aircraft 20 greatly varies and the flight stability tends to decrease when the motor system 10 to rotationally drive these lifting rotors fails rather than when any of the other five lifting rotors 31a through 31e fails. As a solution, the warning level is incremented by one to encourage prompt response when the failed motor system 10 rotationally drives one of the two lifting rotors 31f and 31g provided for the main wing 25.

As above, the abnormality warning system 130 according to the fifth embodiment provides the same effect as the abnormality warning system 130 according to the first embodiment. In addition, the warning level adjustment process is performed to increment the warning level by one when the failed motor system 10 rotationally drives one of the two lifting rotors 31f and 31g provided for the main wing 25. This configuration enables to encourage prompt response by incrementing the warning level by one when a failure occurs in the motor system 10 that, if failed, greatly varies the attitude of the electric aircraft 20 and tends to decrease the flight stability.

F. Sixth Embodiment

The abnormality warning system 130 according to the sixth embodiment differs from the abnormality warning system 130 according to the first embodiment in specific procedures of the warning level setting process. The electric aircraft 20 including the abnormality warning system 130 according to the sixth embodiment uses the same hardware configuration as the electric aircraft 20 according to the first embodiment. The same configuration is designated by the same reference symbol and a detailed description is omitted for the sake of brevity.

The first embodiment uses three warning levels 1 through 3. Meanwhile, the sixth embodiment uses two warning levels, a relatively "low warning level" and a relatively "high warning level." The difference between these two levels corresponds to the difference in urgency, as with the first embodiment. However, the "high warning level" and the "low warning level" share the warning output based on the warning levels, namely, warning messages displayed on the UI unit 50. According to the sixth embodiment, the warning output unit 134 outputs a warning when the abnormality diagnosis shows that the same motor system 10 successively malfunctions as often as the number of times greater than or equal to a threshold. According to the sixth embodiment, the "high warning level" relatively sensitively outputs a warning. The "low warning level" relatively hardly outputs a warning.

Figure 13:
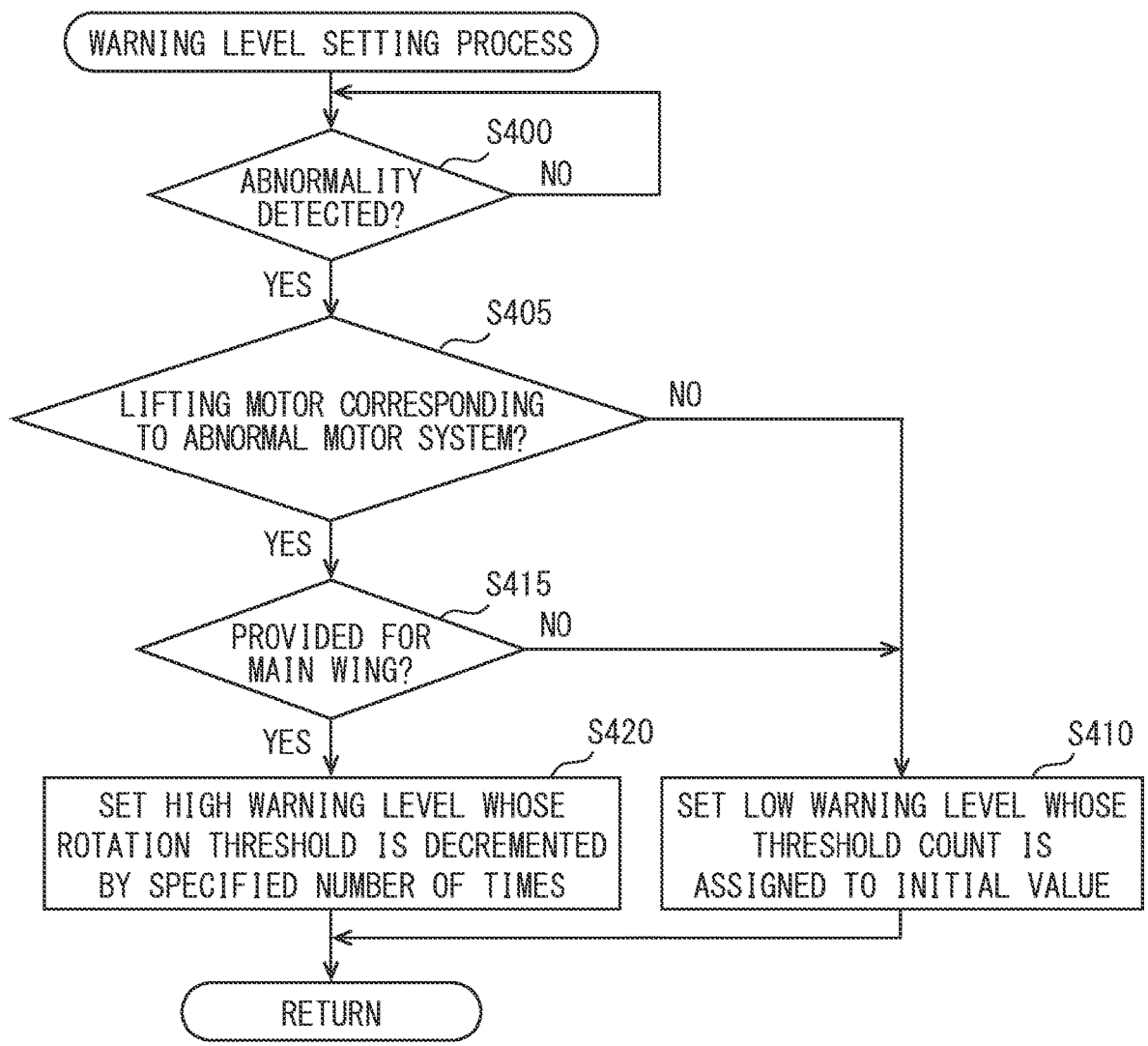
FIG. 13 is a flowchart illustrating a warning level adjustment process according to a sixth embodiment.

As illustrated in FIG. 13, the abnormality determination unit 131 performs an abnormality diagnosis on each motor system 10 and determines whether an abnormality is detected (step S400). It is determined that no abnormality is detected (step S400: NO). Then, the process returns to step S400. Step S400 is equal to step S105 of the first embodiment.

It is determined that an abnormality is detected (step S400: YES). Then, the warning level setting unit 132 determines whether the lifting motor corresponds to the abnormal system detected by the warning level setting process (step S405). Step S405 is equal to step S305 of the fifth embodiment.

It is determined that the lifting motor does not correspond to the abnormal system (step S405: NO). Then, the warning level setting unit 132 sets the warning level to the "low warning level" whose initial value is assigned a "threshold count" used as the condition of warning output (step S410). For example, the initial value is set to "4 times" as the "threshold count."

It is determined that the lifting motor corresponds to the abnormal system (step S405: YES). Then, the warning level setting unit 132 determines whether the rotor 30 driven by the lifting motor is provided for the main wing 25, namely, whether the rotor 30 corresponds to one of the two lifting rotors 31f and 31g (step S415). Step S415 is equal to step S315 in the warning level adjustment process of the fifth embodiment.

It is determined that the rotor 30 driven by the lifting motor is not provided for the main wing 25, namely, the rotor 30 corresponds to any of the lifting rotors 31a through 31e (step S415: NO). Then, step S410 is performed to set the warning level to the "low warning level" whose initial value is assigned the "threshold count" used as the condition of warning output.

It is determined that the rotor 30 driven by the lifting motor is provided for the main wing 25, namely, the rotor 30 corresponds to one of two lifting rotors 31f and 31g (step S415: YES). Then, the warning level setting unit 132 sets the warning level to the "high warning level" for which the "threshold count" used as the condition of warning output is decremented by a specified number of times from the initial value (step S420). In step S420, for example, the threshold count is set to "3." The process returns to step S400 after the completion of step S410 or S420.

For example, suppose a failure occurs in the motor system 10, including the lifting motor, that needs to rotationally drive any of the five lifting rotors 31a through 31e provided for the main body 22. In this case, the threshold count is set to "4", making the warning hardly output. Suppose a failure occurs in the motor system 10 that rotationally drives one of the two lifting rotors 31f and 31g provided for the main wing 25. In this case, the threshold count is set to "3", making the warning sensitively output.

As above, the threshold count is decreased to make the warning sensitively output when the failed motor system 10 rotationally drives one of the two lifting rotors 31f and 31g provided for the main wing 25. The reason is similar to that described in the fifth embodiment. According to the fifth embodiment, the warning level is incremented by one when the failed motor system 10 rotationally drives one of the two lifting rotors 31f and 31g provided for the main wing 25.

The abnormality warning system 130 according to the sixth embodiment provides effects similar to those of the abnormality warning system 130 according to the first embodiment. In addition, the threshold count used for the warning output condition is decreased when the failed motor system 10 rotationally drives one of the two lifting rotors 31f and 31g provided for the main wing 25. This configuration enables to make the warning sensitively output and encourage prompt response when a failure occurs in the motor system 10 that greatly varies the attitude of the electric aircraft 20 and tends to decrease the flight stability. The sixth embodiment may exclude the output rate computation unit 133.

G. Seventh Embodiment

Figure 14:
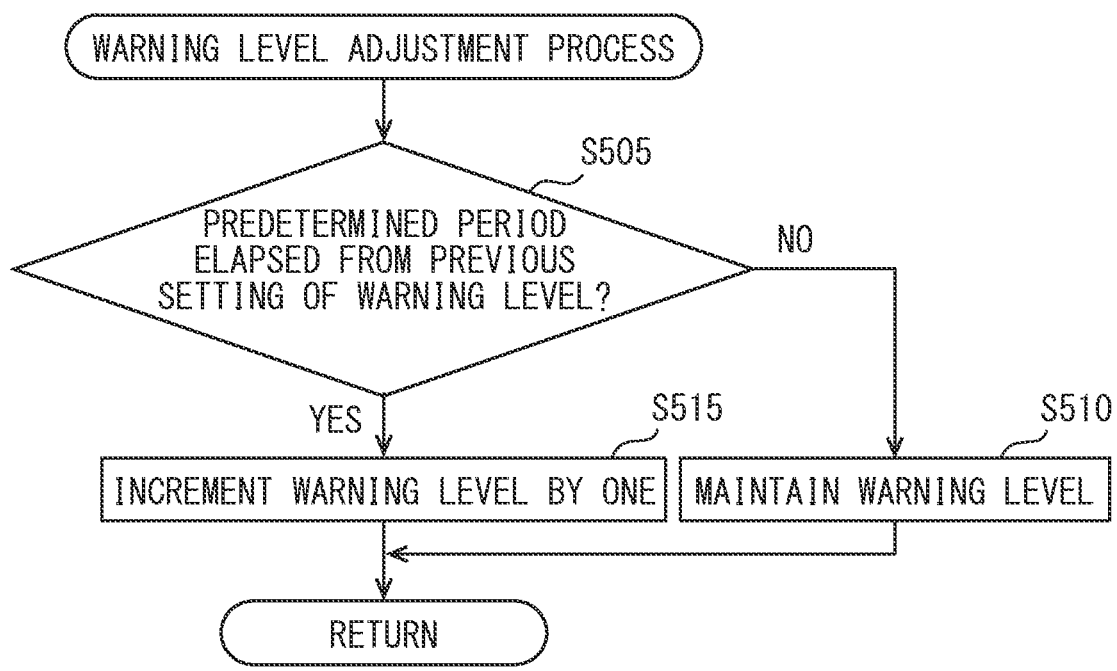
FIG. 14 is a flowchart illustrating a warning level adjustment process according to a seventh embodiment.

The abnormality warning system 130 according to the seventh embodiment uses the same configuration as the abnormality warning system 130 according to the first embodiment. The same configuration is designated by the same reference symbol and a detailed description is omitted for the sake of brevity. The abnormality warning system 130 according to the seventh embodiment is mounted on the same electric aircraft as the electric aircraft 20 according to the first embodiment illustrated in FIG. 1. The abnormality warning system 130 according to the seventh embodiment differs from the abnormality warning system 130 according to the first embodiment in that a warning level adjustment process illustrated in FIG. 14 is performed in addition to the warning level setting process illustrated in FIG. 3. The warning level adjustment process adjusts the warning level set by the warning level setting process. The warning level adjustment process is performed when any of steps S120, S130, and S135 in the warning level setting process is completed.

As illustrated in FIG. 14, the warning level setting unit 132 determines whether a predetermined period has elapsed from the previous setting of the warning level (step S505). It is determined that the predetermined period does not elapse since the previous setting of the warning level (step S505: NO). Then, the warning level setting unit 132 maintains the warning level (step S510). According to the present embodiment, the "predetermined period" of step S505 is set to 3 minutes. The predetermined period is not limited to 3 minutes and may be set to any length.

It is determined that the predetermined period has elapsed since the previous setting of the warning level (step S505: YES). Then, the warning level setting unit 132 increments the warning level by one (step S515). The process returns to step S505 after the completion of step S510 or S515. When the predetermined period has elapsed since the previous setting of the warning level, the flight as long as the predetermined period may increase the possibility of affecting the flight due to failures, in other words, may require a prompt response. For example, suppose a failure of the sensors 13 to 15 prevents the motor 11 from rotating at the optimum operating point and the power consumption of the motor 11 increases to increase the rate of reducing the SOC (State Of Charge) of the power supply 70 (secondary battery). Then, the elapse of the predetermined period may further reduce the SOC and disable the flight from continuing. In such a case, the warning level is incremented by one to output a more urgent warning. The warning level adjustment process according to the seventh embodiment is performed repeatedly. The warning level is incremented by one every elapse of the predetermined period unless the abnormal condition is improved. The longer the abnormal condition continues, the higher the warning level is set.

The abnormality warning system 130 according to the seventh embodiment provides effects similar to those of the abnormality warning system 130 according to the first embodiment. In addition, the warning level is incremented by one when the predetermined period has elapsed since the previous setting of the warning level. This configuration enables to output a more urgent warning when the flight as long as the predetermined period may increase influence on the flight due to failures and may require a prompt response.

H. Other Embodiments (H1) In the embodiments, the output ratio computed by the output rate computation unit 133 signifies the ratio of the total motor output of the motor system to the required motor output. However, the present disclosure is not limited thereto. The output ratio may signify the ratio of the number of normal rotors 30 (motors 11) capable of output to the minimum number of rotors 30 (motors 11) required for the flight of the electric aircraft 20. This configuration also provides effects similar to those of the embodiments.

(H2) The fifth embodiment determines whether to increment by one the warning level depending on whether the failed motor system 10 is provided for the main wing 25. However, the present disclosure is not limited thereto. Consider a warning level for the motor system 10 corresponding to the lifting rotor placed far from the barycentric position CM of the electric aircraft 20. Consider a warning level for the motor system 10 corresponding to the lifting rotor placed near the barycentric position CM. Then, the former warning level may be set higher than the latter warning level. Specifically, the main body 22 includes the five lifting rotors 31a through 31e. A warning level may be set when the lifting rotor 31a placed at the barycentric position CM fails. A warning level may be set when the other four lifting rotors 31b through 31e fail. Then, the latter warning level may be set higher than the former warning level. This configuration allows the warning level for the motor system 10 corresponding to the lifting rotor placed far from the barycentric position CM to be higher than the warning level for the motor system 10 corresponding to the lifting rotor placed near the barycentric position CM. This configuration enables to provide a higher warning level against an abnormality in the motor system 10 corresponding to the rotor that is placed far from the barycentric position CM and therefore greatly affects the flight and the attitude of the electric aircraft 20 due to abnormal rotation.

(H3) The sixth embodiment determines whether to increase the rotation threshold depending on whether the failed motor system 10 is provided for the main wing 25. However, the present disclosure is not limited thereto. Consider a threshold count for the motor system 10 corresponding to the lifting rotor located far from the barycentric position CM of the electric aircraft 20. Consider a threshold count for the motor system 10 corresponding to the lifting rotor placed near the barycentric position CM. Then, the former threshold count may be smaller than the latter threshold count. This configuration provides effects similar to those of the sixth embodiment. In addition, this configuration enables to sensitively output the warning and exactly encourage prompt response to a failure in the motor system 10 that is placed farther from the barycentric position CM and therefore tends to greatly vary the attitude of the electric aircraft 20 and degrade the flight stability in the event of a failure.

(H4) The warning level adjustment process according to the seventh embodiment determines in step S505 whether a predetermined period has elapsed from the previous setting of the warning level. However, the present disclosure is not limited thereto. An example is to previously provide the threshold time to increment the warning level referring to the time elapsed from the time to first identify an abnormality. Specifically, provide a threshold time to increment the warning level by one and another threshold time to further increment the warning level by one. Step S505 may determine "whether the elapsed time has reached the threshold time."

(H5) The embodiments use two or three warning levels. However, the present disclosure is not limited thereto. Two or more warning levels may be available. For example, the first embodiment may use four or more warning levels. Multiple thresholds may be provided for the total motor output of the lifting motor and the total motor output of the thrust motor. Different warning levels may be provided for the multiple output levels identified by the thresholds. Similarly, the third embodiment may also provide three or more thresholds for the total motor output. For example, see a warning level map 135a illustrated in FIG. 15. The fourth embodiment may provide a "lift force loss" as a new output level for the lifting motor. When this output level takes effect, it may be favorable to enable "warning level 4" higher than warning level 3 regardless of the output levels of the thrust motor. According to this configuration, the warning level setting unit 132 provides a higher warning level for the case of impairing the lift function (losing the lift force) compared to the case of impairing the thrust function (losing the thrust force) in terms of the thrust function and the lift function. This configuration provides a higher warning level for damage to only the lift function compared with damage to only the thrust function in terms of the thrust function and the lift function. This configuration enables to prevent the safety of electric aircraft from being greatly impaired. In this configuration, the output rate computation unit 133 is comparable to an output rate computation unit and a lost function identification unit according to the present disclosure. Consider a case where neither the thrust function nor the lift function is impaired. In such a case, according to this configuration and the fourth embodiment, the warning level setting unit 132 enables the warning level or a lower level applied to the case where at least the thrust function or the lift function is impaired. This configuration enables to avoid taking emergency response and causing inconvenience to the electric aircraft occupant even though neither the thrust function nor the lift function is impaired.

(H6) The warning level adjustment process adjusts the warning level depending on whether the failed system corresponds to the main wing 25 (fifth embodiment) or a predetermined period has elapsed from the previous setting of the warning level (sixth embodiment). However, the present disclosure is not limited thereto. For example, it may be favorable to adjust the warning level settled by the warning level setting process based on parameters such as the charge level (battery SOC) of the power supply 70, the distance to an airport, the altitude, the number of occupants, the airframe weight, and the airframe type. Specifically, the warning level may be increased as the charge level (battery SOC) of the power supply 70 decreases, the distance to an airport increases, the altitude increases, the number of occupants increases, or the airframe weight increases. In terms of airframe types, the warning level may be adjusted by increasing the warning level for a wingless type compared to a winged type or for a type using a few motors compared to a type using many motors, for example. It may be favorable to score these parameters and set the warning levels according to the total score of all parameters. Instead of these parameters, it may be also favorable to score the output ratio and the degree of influence on the controllability described above and set the warning levels according to their total value. In such a configuration, the cooling performance of the motor 11 may be scored and added to the total value. In terms of the cooling performance, for example, the temperature of a cooling medium may be scored so that the score increases, and the warning level tends to increase as the temperature rises.

(H7) The abnormality warning systems 130 and 130a according to the embodiments are merely examples and can be variously modified. For example, the abnormality warning system 130 or 130a may not be installed on the electric aircraft 20 or 20a but may be configured as a server installed in a control tower on the ground, for example. In this configuration, the communication via the communication device 60 may control each motor system 10 or perform the abnormality diagnosis, the warning level setting process, and the warning level adjustment process on each motor system 10. According to the embodiments, the motor system 10 includes the motor 11. However, the motor 11 may be excluded. According to the other embodiments except for the fourth and sixth embodiments, step S110 of the warning level setting process uses the map that previously lists "abnormal contents affecting thrust or lift force." Instead of or in addition to this map, it may be favorable to use a map that lists "abnormal contents not affecting thrust or lift force." The motor 11 may be configured as a motor generator.

(H8) The abnormality warning systems 130 and 130a and the technique thereof described in the present disclosure may be embodied by a dedicated computer that is provided by configuring memory and a processor programmed to perform one or more functions embodied by a computer program. Alternatively, the abnormality warning systems 130 and 130a and the technique thereof described in the disclosure may be embodied by a dedicated computer that is provided by configuring a processor through the use of one or more dedicated hardware logic circuits. Alternatively, the abnormality warning systems 130 and 130a and the technique thereof described in the disclosure may be embodied by one or more dedicated computers each configured by a combination of memory, a processor programmed to perform one or more functions, and a processor composed of one or more hardware logic circuits. The computer program may be provided as instructions executed by the computer and may be stored in a computer-readable non-transitional tangible recording medium.

The present disclosure is not limited to the above-described embodiments but can be embodied in various configurations without departing from the spirit and scope thereof. For example, the technical features in the embodiments corresponding to the technical features according to the aspects described in the summary of the invention can be interchanged or combined as appropriate to solve all or part of the above-described issues or to achieve all or part of the above-described effects. A technical feature, if not stated as an essential part in the present specification, can be eliminated as appropriate.

What is claimed is:

1. An abnormality warning system for a plurality of motor systems, the motor systems being configured to respectively drive a plurality of motors corresponding to a plurality of rotors in an electric aircraft, the abnormality warning system comprising a processor programmed to:
   determine a motor system, which is abnormal, among the motor systems; and
   set a plurality of warning levels to warn of abnormality in the determined motor system based on at least one of
      installation position information of a rotor, which corresponds to the motor system determined to be abnormal, among the rotors in the electric aircraft and
      a function of the corresponding rotor, wherein
   the plurality of warning levels include
      a warning level to warn of an abnormality in the determined abnormal motor system that enables flight of the electric aircraft to continue as is, and
      a warning level to warn of an abnormality in the determined abnormal motor system that requires an emergency landing of the electric aircraft.

2. The abnormality warning system according to claim 1, wherein the processor is further programmed to:
   compute an output ratio, which is a ratio of a total motor output from the motor systems to a required motor output required for flight of the electric aircraft; and
   set the plurality of warning levels based on the output ratio.

3. The abnormality warning system according to claim 1, wherein
   the electric aircraft includes, as the rotors, two types of rotors including
      a lifting rotor to provide a lift function to the electric aircraft, and
      a thrust rotor to provide a thrust function to the electric aircraft.

4. The abnormality warning system according to claim 3, wherein the processor is further programmed to:
   identify, when the motor system is determined to be abnormal, whether each of the lift function and the thrust function is impaired; and when none of the thrust function and the lift function is impaired, set the plurality of warning levels to be the same as or lower than the plurality of warning levels when at least one of the thrust function or the lift function is impaired.

5. The abnormality warning system according to claim 4, wherein
the processor is programmed to, when the lift function is impaired, set the plurality of warning levels to be higher than the plurality of warning levels when the thrust function is impaired.

6. The abnormality warning system according to claim 5, wherein
the plurality of rotors includes a plurality of lifting rotors, and
the processor is further programmed to set the plurality of warning levels for the motor system corresponding to a lifting rotor, which among the lifting rotors is located far from an airframe gravity center of the electric aircraft, to be higher than the plurality of warning levels for the motor system corresponding to a lifting rotor, which among the lifting rotors is located near the airframe gravity center of the electric aircraft.

7. The abnormality warning system according to claim 1, wherein the processor is further programmed to:
on determination that one of the motor systems is abnormal continuously for a predetermined threshold count, determine that the one of the motor systems is abnormal;
set the plurality of warning levels by settling the threshold count based on at least one of the installation position information or the function;
set the plurality of warning levels to be higher as the threshold count becomes smaller; and
set the plurality of warning levels to be lower as the threshold count becomes greater.

8. The abnormality warning system according to claim 1, wherein the processor is further programmed to:
vary the plurality of warning levels according to a period in which a same motor system of the plurality of motor systems is determined to be abnormal; and
when the period is long, set the plurality of warning levels to be higher than the plurality of warning levels when the period is short.

9. The abnormality warning system according to claim 1, wherein
the plurality of warning levels further include a warning level to warn of an abnormality that requires shortening a flight plan of the electric aircraft.

10. A warning level setting method for a plurality of motor systems, the motor systems being configured to respectively drive a plurality of motors corresponding to a plurality of rotors in an electric aircraft, the warning level setting method comprising:
determining a motor system to be abnormal among the motor systems; and
setting a plurality of warning levels based on at least one of
installation position information of a rotor, which corresponds to the motor system determined to be abnormal, among the rotors in the electric aircraft and
a function of the corresponding rotor, wherein
the plurality of warning levels include
a warning level to warn of an abnormality in the determined abnormal motor system that enables flight of the electric aircraft to continue as is, and
a warning level to warn of an abnormality in the determined abnormal motor system that requires an emergency landing of the electric aircraft.

11. The warning level setting method according to claim 10, wherein
the plurality of warning levels further include a warning level to warn of an abnormality that requires shortening a flight plan of the electric aircraft.

12. A non-transitory computer-readable medium storing instructions for causing a processor of an abnormality warning system to:
determine an abnormal motor system among a plurality of motor systems, the motor systems being configured to respectively drive a plurality of motors corresponding to a plurality of rotors in an electric aircraft;
set a plurality of warning levels based on at least one of
installation position information of a rotor, which corresponds to the abnormal motor system, among the rotors and
a function of the corresponding rotor; and
cause to be provided an abnormality warning based on the plurality of warning levels, wherein
the plurality of warning levels include
a warning level to warn of an abnormality in the determined abnormal motor system that enables flight of the electric aircraft to continue as is, and
a warning level to warn of an abnormality in the determined abnormal motor system that requires an emergency landing of the electric aircraft.

13. The non-transitory computer-readable medium according to claim 12, wherein
the plurality of warning levels further include a warning level to warn of an abnormality that requires shortening a flight plan of the electric aircraft.

* * * * *